(12) United States Patent
Lee

(10) Patent No.: US 12,065,249 B2
(45) Date of Patent: Aug. 20, 2024

(54) SEAT EXTENSION APPARATUS, CABIN DIVIDING ELEMENT AND AIRCRAFT CABIN

(71) Applicant: Adient Aerospace LLC, Bothell, WA (US)

(72) Inventor: Sahng Seok Lee, Bothell, WA (US)

(73) Assignee: Adient Aerospace LLC, Bothell, WA (US)

(*) Notice: Subject to any disclaimer, the term of this patent is extended or adjusted under 35 U.S.C. 154(b) by 939 days.

(21) Appl. No.: 17/080,818

(22) Filed: Oct. 26, 2020

(65) Prior Publication Data

US 2021/0122472 A1 Apr. 29, 2021

Related U.S. Application Data

(60) Provisional application No. 62/925,496, filed on Oct. 24, 2019.

(51) Int. Cl.
*B64D 11/06* (2006.01)
*B64D 11/00* (2006.01)

(52) U.S. Cl.
CPC ...... *B64D 11/0604* (2014.12); *B64D 11/0023* (2013.01); *B64D 11/0698* (2014.12)

(58) Field of Classification Search
CPC ............ B64D 11/0602; B64D 11/0604; B64D 11/0605; B64D 11/0606; B64D 11/0641; B64D 11/0643; B64D 11/0691; B64D 11/0698; B64D 2011/0069; B60N 3/063
See application file for complete search history.

(56) References Cited

U.S. PATENT DOCUMENTS

| 2,614,613 | A |   | 10/1952 | Bushong |  |
|---|---|---|---|---|---|
| 2,632,408 | A | * | 3/1953 | Giles | B64D 11/0604 |
|   |   |   |   |   | 105/344 |
| 3,264,033 | A |   | 8/1966 | Hansburg |  |
| 3,898,704 | A | * | 8/1975 | Gallaher | B64D 11/0691 |
|   |   |   |   |   | 244/118.6 |
| 5,738,306 | A | * | 4/1998 | Moss | B64D 9/00 |
|   |   |   |   |   | 244/118.6 |
| 7,997,531 | B2 | * | 8/2011 | Bettell | B64D 11/0606 |
|   |   |   |   |   | 244/118.6 |

(Continued)

FOREIGN PATENT DOCUMENTS

| DE | 10114837 A1 | * | 10/2002 | ......... B64D 11/0638 |
| GB | 2526358 A | * | 11/2015 | ............. B61D 31/00 |

OTHER PUBLICATIONS

Translation of DE10114837A1 (Year: 2002).*

(Continued)

*Primary Examiner* — Richard Green
(74) *Attorney, Agent, or Firm* — Jordan IP Law, LLC

(57) ABSTRACT

A seat extension apparatus for a cabin dividing element, in particular of an aircraft cabin, the seat extension apparatus comprising at least an extension device having a mounting side and a bed surface side, wherein the extension device is movable between a vertical stowed position and a horizontal use position, and a support structure coupled to the extension device to pivotably support the extension device, wherein the support structure comprises at least one pivotable strut element having at least one end pivotably coupled to the mounting side of the extension device and at least one free end.

20 Claims, 19 Drawing Sheets

(56) References Cited

U.S. PATENT DOCUMENTS

| | | | |
|---|---|---|---|
| 8,616,643 B2* | 12/2013 | Darbyshire | B64D 11/0641 |
| | | | 297/340 |
| 8,960,602 B2* | 2/2015 | Neumann | B64D 11/0023 |
| | | | 244/129.4 |
| 10,059,455 B2* | 8/2018 | Pacheco | B64D 11/0691 |
| D833,161 S | 11/2018 | Haskell | |
| 2005/0040288 A1 | 2/2005 | Keogh | |
| 2005/0087650 A1 | 4/2005 | Quan et al. | |
| 2014/0084562 A1* | 3/2014 | Anooshian | A61G 3/0808 |
| | | | 296/65.04 |
| 2018/0057169 A1 | 3/2018 | Phi | |

OTHER PUBLICATIONS

"Extended European Search Report for Application No. 20203584.6", Mailed Date: Mar. 12, 2021, 12 Pages.

Juttner, et al., "Vertriebserfolg mit SAP C/4HANA bei Weinmann Emergency", Camelot Consulting Group Blog, Oct. 21, 2019, pp. 1-9.

Extended European Search Report, Application No. 23156261.2, Dated Apr. 17, 2023.

* cited by examiner

SEAT EXTENSION APPARATUS, CABIN DIVIDING ELEMENT AND AIRCRAFT CABIN

This nonprovisional application claims priority to U.S. Provisional Application No. 62/925,496, which was filed on Oct. 24, 2019, and which is herein incorporated by reference.

BACKGROUND OF THE INVENTION

Field of the Invention

The present invention relates to seating arrangements in passenger vehicles such as aircraft often have limited space. Moreover, such seating arrangements are often configured such that the passenger is in a substantially upright or a slightly reclined position (e.g., a seated position). However, sitting upright for long periods of time can cause strain and is undesirable, such as on long flights.

SUMMARY OF THE INVENTION

It is therefore an object of the present invention to provide examples herein provide an improved seat extension apparatus which increases comfort of a passenger. Any examples and embodiments not falling under the scope of the claims are provided for illustration purposes. In particular, said seat extension apparatus is optimized and configured for a cabin dividing element, such as a bulkhead. The seat extension apparatus is also configured to provide an improved, stable and wide lay-flat bed surface to the passenger. The seat extension apparatus can be fixed to any type of cabin dividing element, such as a bulkhead or any other cabin interior and furniture element. Further, an improved cabin dividing element providing said seat extension apparatus and an improved aircraft cabin for a passenger is provided.

A seat extension apparatus for a cabin dividing element, in particular of an aircraft cabin, the seat extension apparatus comprising at least an extension device having a mounting side and a bed surface side, wherein the extension device is movable between a vertical stowed position and a horizontal use position. Further, the seat extension apparatus comprising a support structure coupled to the extension device to pivotably support the extension device, wherein the support structure comprises at least one pivotable strut element having at least one end pivotably coupled to the mounting side of the extension device and at least one free end. In the vertical stowed position of the extension device the strut element is arranged substantially parallel to a longitudinal axis of the extension device, and in the horizontal use position of the extension device the strut element is arranged substantially perpendicular or angled to the longitudinal axis of the extension device.

In the vertical stowed position, the mounting side is facing into the aircraft cabin. For example, the mounting side is facing in a direction toward a passenger seat. The bed surface side is arranged on an opposite side of the mounting side. For example, the bed surface side and the mounting side are arranged extending parallel to each other. In the horizontal use position, the mounting side is arranged on a bottom of the bed surface side. For example, the mounting side is arranged facing in a direction toward a cabin floor. The bed surface side is arranged facing in a direction toward a cabin ceiling.

For example, the extension device is configured as a bulkhead economy bed. For example, the extension device is configured as a substantially panel-shaped shelf element. For example, the extension device is configured as an ottoman.

For example, the bed surface side of the extension device is cushioned providing more comfort to a passenger when the extension device is moved to the horizontal use position. In this position, the bed surface side is arranged in a cabin space. That means that the bed surface side of the extension device is visible and so as usable for the passenger as body support element. The strut element is constructed to stably support the extension device in the horizontal use position, such as a wide lie-flat bed position, on a cabin floor. In particular, the second free end is configured to be positioned on the cabin floor in a slip-resistant manner.

In the vertical stowed position of the extension device the bed surface side is substantially hidden from view of the passenger. In this position, the mounting side of the extension device is visible to the passenger. For instance, the mounting side comprises an optically appealing finish, such as a layer, a cover, a coating or the like which fits to a design of the aircraft cabin. The mounting side may be provided with any surface material, a placard and/or a logo design.

For example, the seat extension apparatus is fixed to a cabin dividing element, such as a bulkhead, positioned in front of a passenger seating arrangement, such as a single seat or a row of at least two seats adjacent to each other in transverse direction of the cabin. The cabin dividing element is a shell-like or wall-like element, such as a bulkhead, which for example divides aircraft cabin classes. The cabin dividing element may be arranged between a cabin seating arrangement and a galley or between a cabin seating arrangement and a doorway of the aircraft. When the extension device is positioned in the vertical stowed position a wide leg-space is provided in front of the passenger seating arrangement, for example between the cabin dividing element and the passenger seating arrangement. Thereby, the bed surface side is in alignment with the cabin dividing element. To provide a wide bed to the passenger(s) of the passenger seating arrangement, the extension device can be moved, for example fold down in a pivot motion away from the cabin dividing element, into the horizontal use position. The bed surface side and a seat cushion create one continuously lay-flat bed surface to the passenger.

In an example, the mounting side of the extension device comprises at least one carrier device to which the strut element is pivotably coupled to. The carrier device is arranged on side of the mounting side. The carrier device may be attached to the mounting side by a firm bond, force-fit and/or form-fit connection.

In an example, the carrier device and the extension device are configured as one-piece element. The extension device and the carrier device may be a molded, such as injection-molded part.

In an example, the carrier device comprises at least one recess into which the strut element is fully arranged when the extension device is in the vertical stowed position.

In an example, the extension device comprises an integrated carrier device with a recess. For example, the extension device and the carrier device are configured as one-piece component.

In an example, the carrier device comprises at least one storage pocket. For example, the storage pocket can be used to stow private items of the passenger and/or items provided by airline, such as magazines, a headphone or the like.

To provide enough mounting space e.g. for the strut, the recess and the storage pocket, the carrier device is configured as a substantially box-shaped support element.

In an example, the strut element is substantially U-shaped. For example, free ends of legs of the U-shaped strut element are connected to the extension device. The storage pocket may be formed between the legs of the U-shaped strut element. A connecting portion of the legs of the U-shaped strut element is configured to be positioned on the cabin floor to sturdy support the extension device in the horizontal use position.

In an example, the support structure comprises at least one support linkage configured to pivotably couple the extension device to the support structure.

In an example, the support linkage is coupled to each one of the extension device and the support structure via a pivot point.

In an example, a pivot point of the strut element and the pivot point of the support linkage are substantially arranged on the same pivot axis.

In an example, the pivot axis is arranged in a center area of the extension device and perpendicular to the longitudinal axis of the extension device.

In an example, when the extension device is pivoted from the vertical stowed position to the horizontal use position, the strut element is pivoted such that the strut element is fully arranged outside the recess of the carrier device.

In an example, a rear side of the extension device comprises at least one latch mechanism to latch the extension device in the horizontal use position.

A cabin dividing element for an aircraft cabin is provided, in particular arranged in front of a passenger seating arrangement, the cabin dividing element comprising at least a wall surface and a seat extension apparatus as described above, wherein the seat extension apparatus is coupled to the wall surface.

In an example, the support structure comprises at least a bracket fixedly connected to the wall surface to pivotably support the extension device relative to the wall surface.

In an example, the wall surface comprises a latch element for the latch mechanism of the seat extension apparatus so that the extension device is latched to the wall surface in the horizontal use position.

In an example, the wall surface comprises an attachment mechanism for at least one bassinet. Hence, parents can lie flat on the seat extension apparatus or sit on the passenger seating arrangement while their baby is safely located near to them.

Moreover, according to the disclosure, an aircraft cabin comprising at least a passenger seating arrangement, a cabin dividing element as described above, wherein the cabin dividing element is arranged in front of the passenger seating arrangement.

In an example, the passenger seating arrangement comprises at least one pivotable armrest having at least one stowable tray table. Particularly, a movable tray table is integrated inside the armrest. The armrest provides an in-arm tray table. The tray table may be moved out from the inside of the armrest to provide a surface panel to the passenger.

In an example, the armrest is movable between a retracted stowed position, in which the armrest is arranged substantially alongside a side surface of a backrest of the passenger seating arrangement, and a deployed use position, in which the armrest is arranged substantially parallel and above a seat cushion of the passenger seating arrangement.

In an example, the extension device is positioned in the horizontal use position the bed surface side of the extension device is in alignment with a seat surface of the passenger seating arrangement.

Further, a method of deploying of a seat extension apparatus of the cabin dividing element is provided. The method comprises at least the steps of moving the extension device from the vertical stowed position to the horizontal use position and pivoting the support structure such that the strut element moves from the substantially parallel orientation to the substantially perpendicular or angled orientation relative to the extension device. For example, after a predefined path of motion of the extension device, the support structure actuates such that the strut element moves from the substantially parallel orientation to the substantially perpendicular or angled orientation. The support structure may be spring-loaded. The support structure may be automatically driven.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
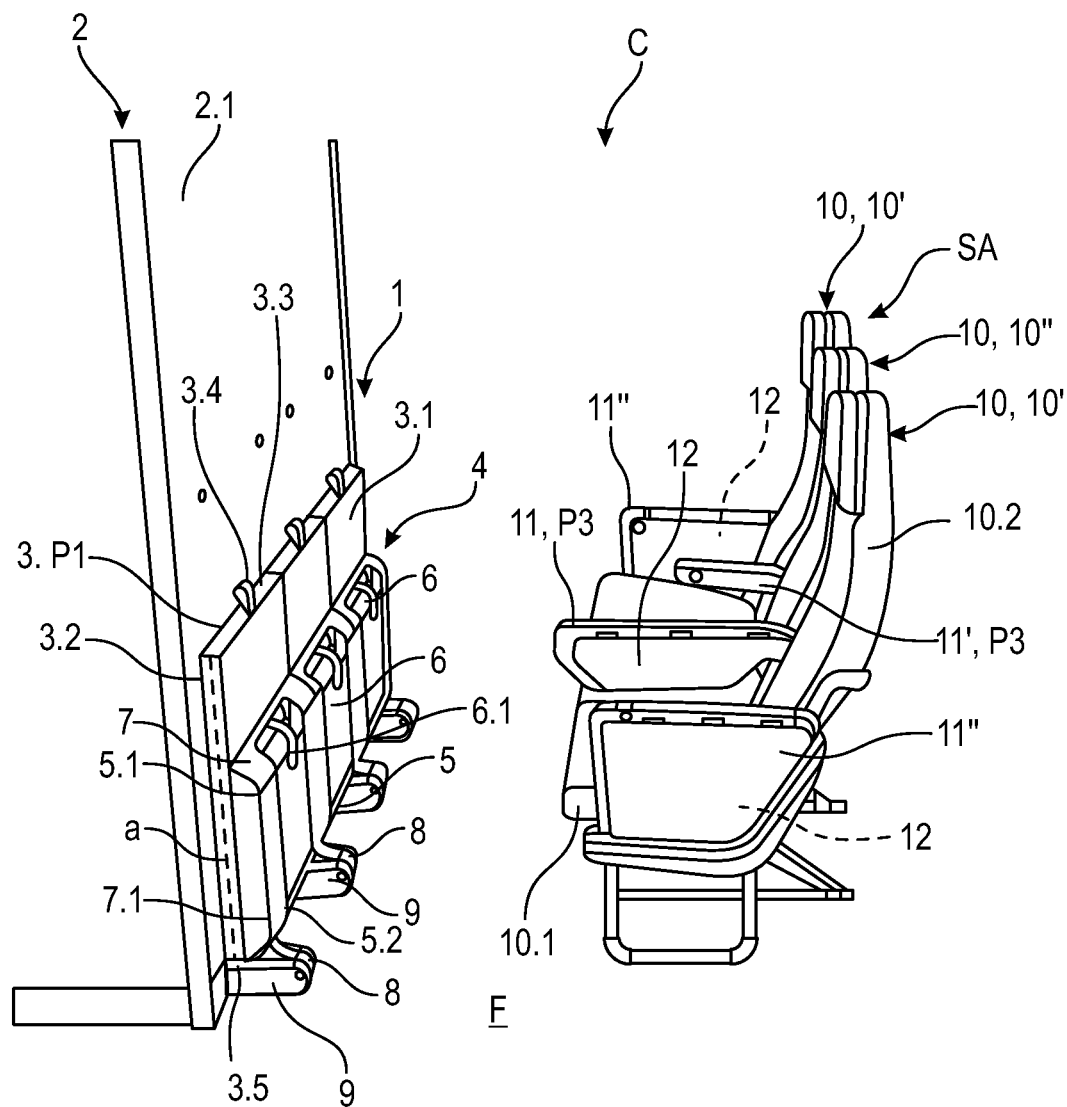
FIGS. 1A to 1F how in perspective views an embodiment of a seat extension apparatus and a conversion of the seat extension apparatus from a vertical stowed position to a horizontal use position, in accordance with an example.
Figure 1B:
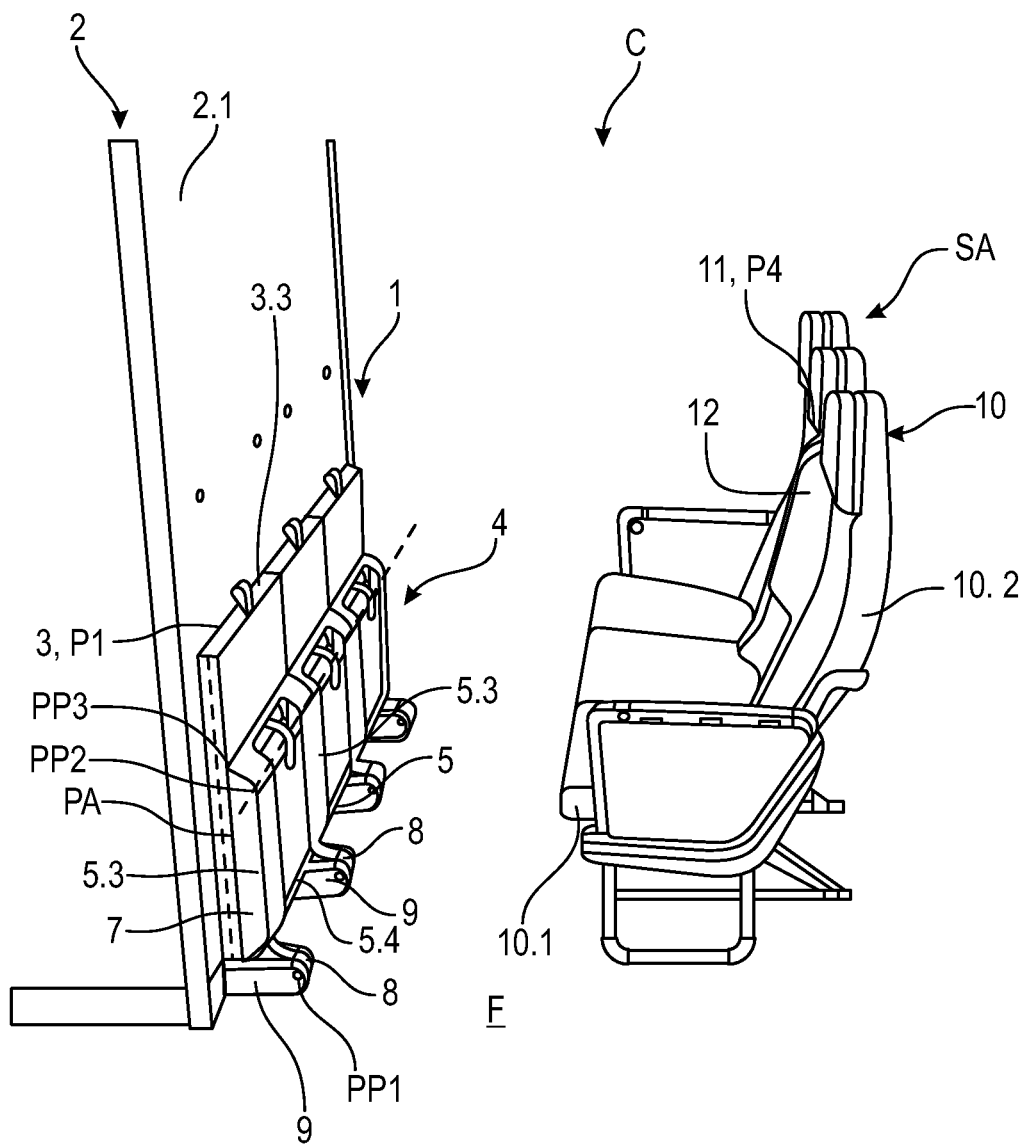
Figure 1C:
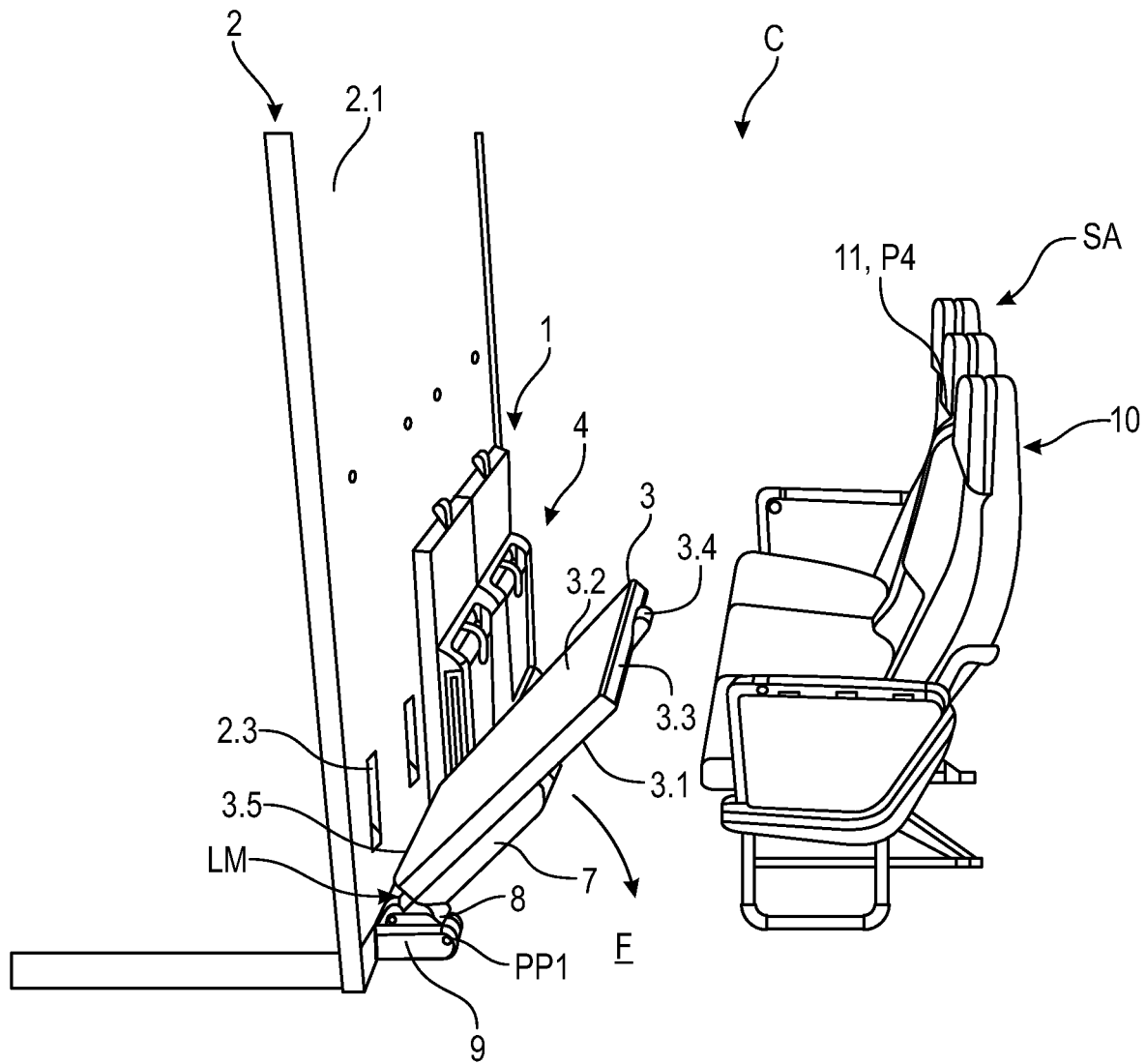
Figure 1D:
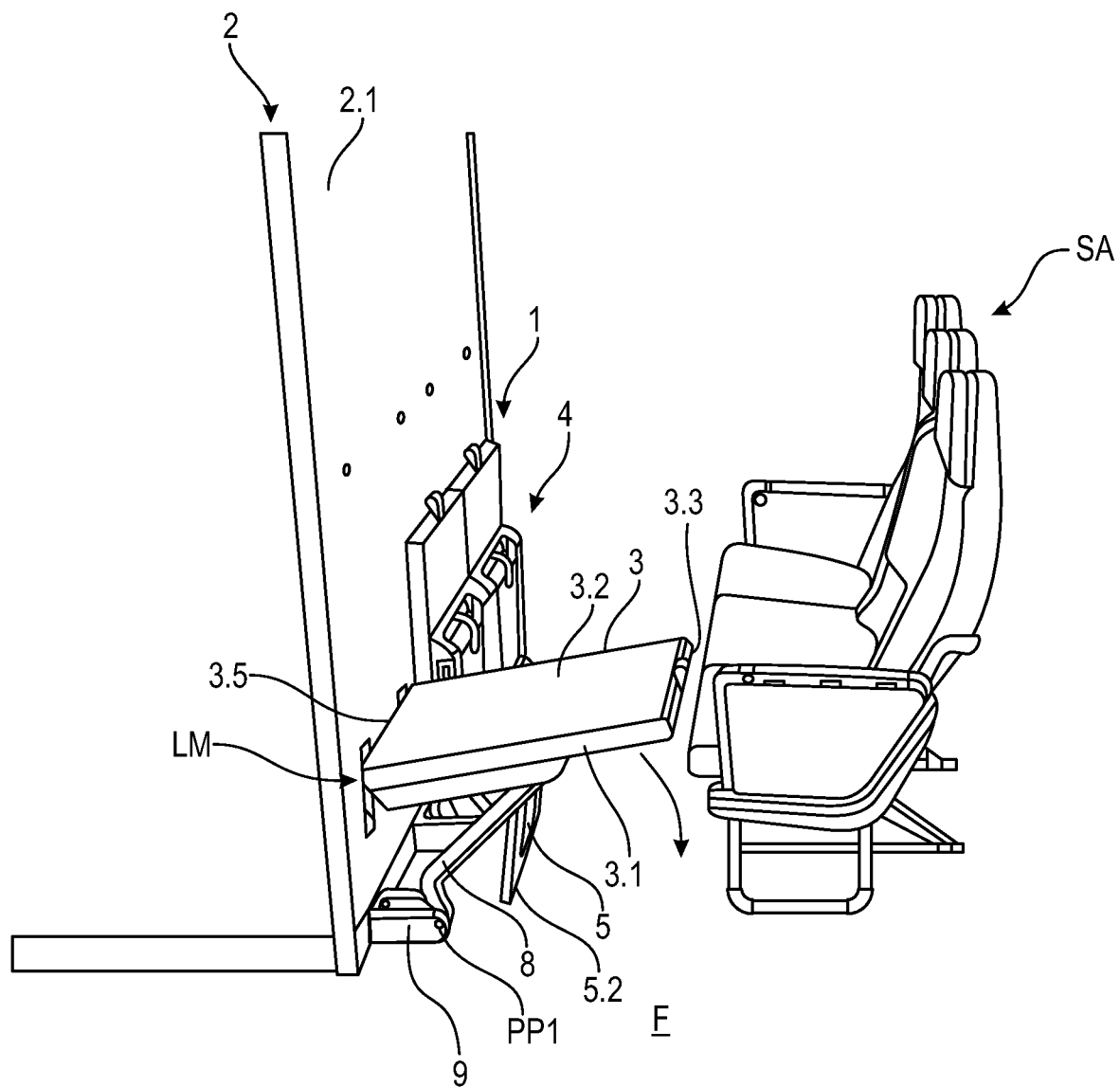
Figure 1E:
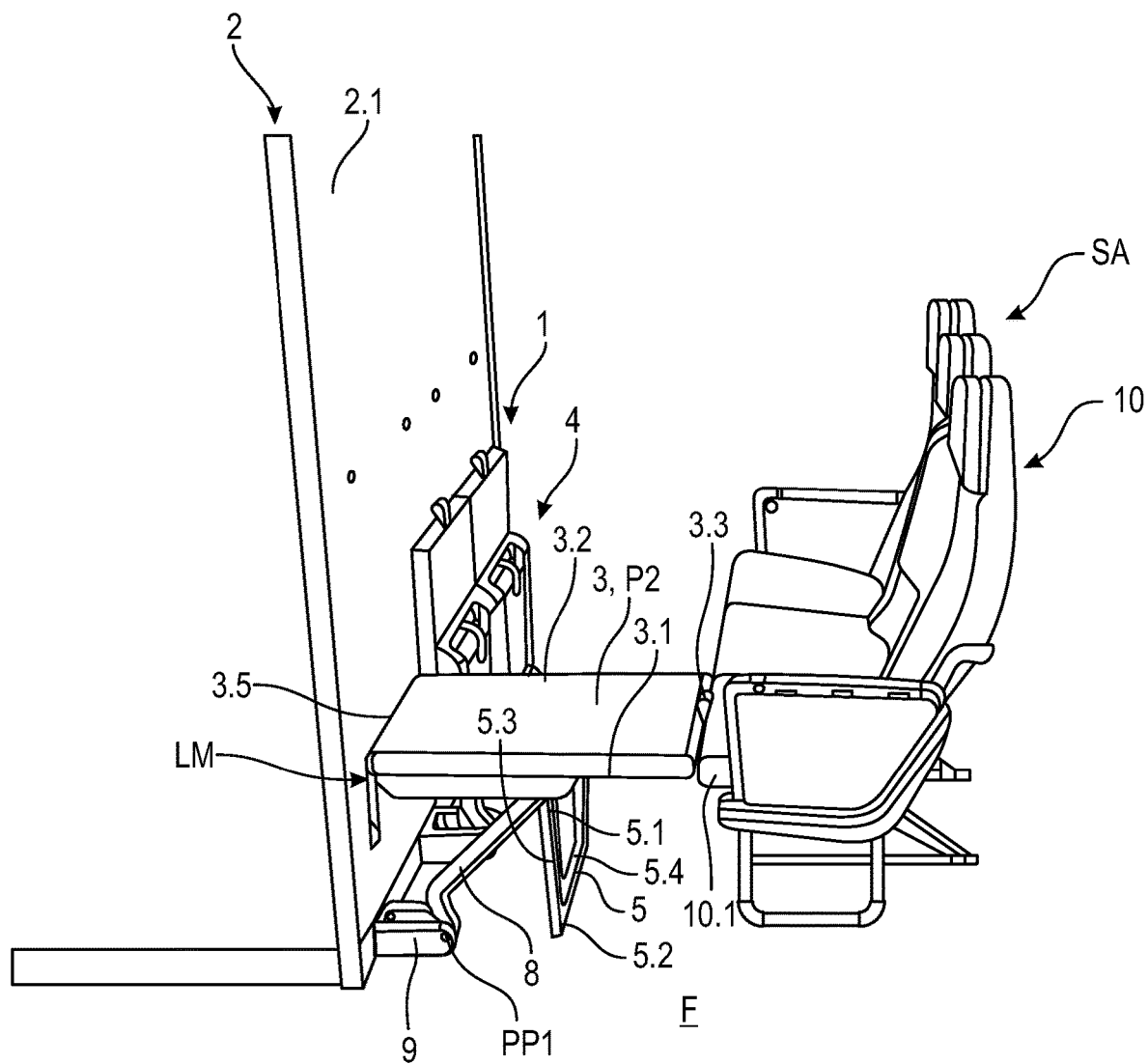
Figure 1F:
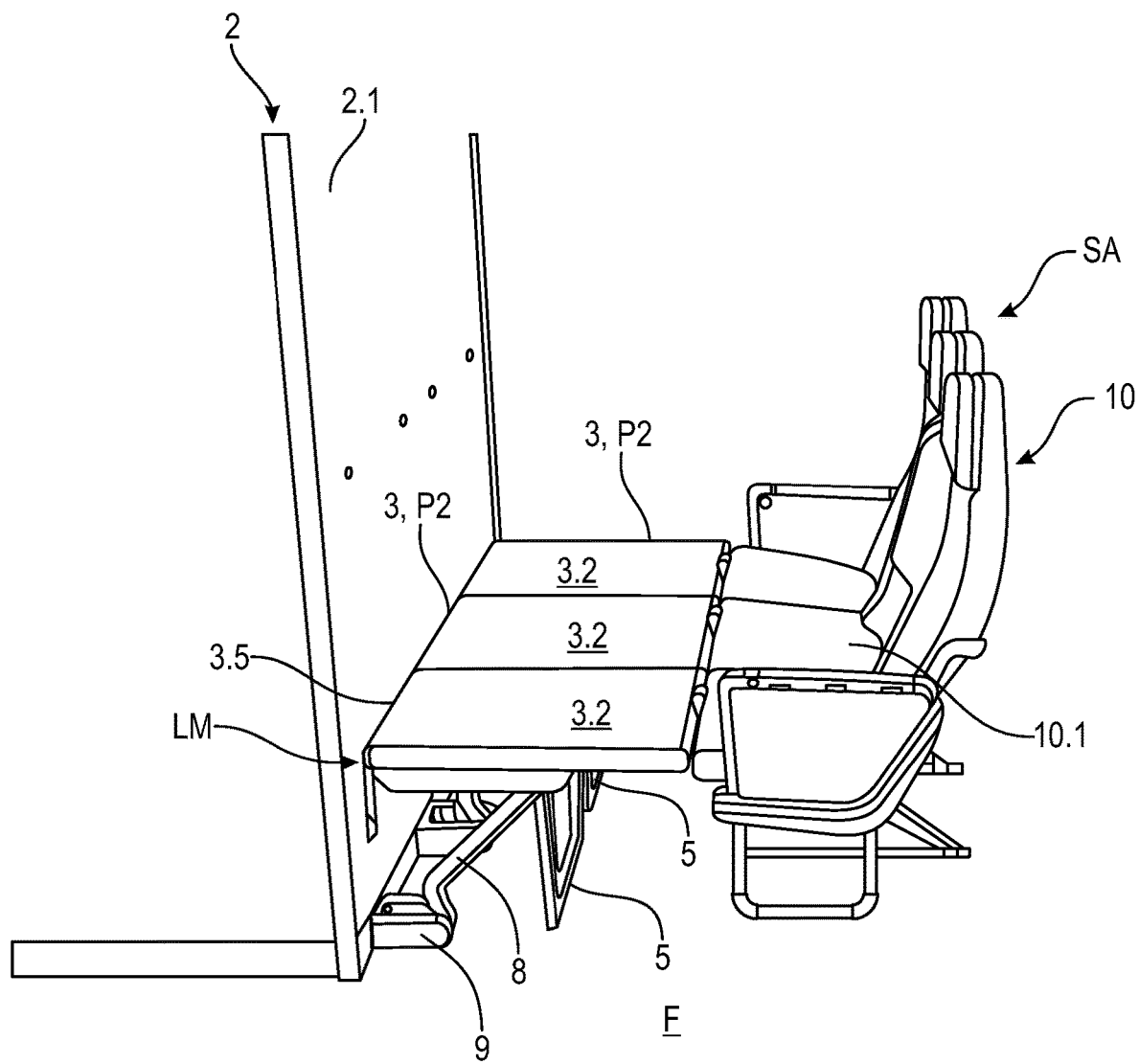

FIGS. 1A to 1F show in perspective views an example of a seat extension apparatus 1 and a conversion of the seat extension apparatus 1 from a vertical stowed position P1, as shown in FIGS. 1A and 1B, to a horizontal use position P2, as shown in FIGS. 1E and 1F. In particular, the FIGS. 1A to 1F shows an aircraft cabin C having a cabin dividing element 2, such as a bulkhead, and a passenger seating arrangement SA, wherein the seat extension apparatus 1 is fixed to the cabin dividing element 2. The passenger seating arrangement SA is arranged behind the cabin dividing element 2 and, for example, facing in flight direction of an aircraft. In particular, the seat extension apparatus 1 and the cabin dividing element 2 provide an improved bed feature within the aircraft cabin C.

The seat extension apparatus 1 comprises an extension device 3 having a mounting side 3.1 and a bed surface side 3.2. The extension device 3 is movable between the vertical stowed position P1 and the horizontal use position P2. Further, the seat extension apparatus 1 comprises a support structure 4 coupled to the extension device 3 to pivotably support the extension device 3 on the cabin dividing element 2. The support structure 4 comprises a pivotable strut element 5 having a first end 5.1 pivotably coupled to the mounting side 3.1 of the extension device 3 and a second free end 5.2. The strut element 5 is substantially U-shaped. For example, free ends 5.2 of the two legs 5.3 of the U-shaped strut element 5 are connected to the extension device 3. A connecting portion 5.4 of the legs 5.3 of the U-shaped strut element 5 is configured to be positioned on a cabin floor F to sturdy support the extension device 3 in the horizontal use position P2. The strut element 5 being U-shaped provides a simple synchronized movement of the legs 5.3. In another embodiment, the strut element 5 may be substantially O-shaped. The first ends 5.1 may be coupled together by a second connecting portion which is pivotably coupled to the mounting side 3.1. Alternatively, the strut element 5 may comprise two separate legs 5.3 arranged parallel to each other, wherein the free end 5.2 of each leg 5.3 is positioned on the cabin floor F in the horizontal use position P2 of the extension device 3. Each leg 5.3 may be substantially I-shaped. The strut element 5 may be spring-loaded for a damped motion.

In the vertical stowed position P1 the strut element 5 is arranged substantially parallel to a longitudinal axis a of the extension device 3. In the horizontal use position P2 of the extension device 3 the strut element 5 is arranged substantially perpendicular or angled to the longitudinal axis a of the extension device 3.

For example, the bed surface side 3.2 is cushioned providing more comfort to a passenger O when the extension device 3 is positioned in the horizontal use position P2. In this position, the bed surface side 3.2 is visible and so as usable for the passenger O as body support element. The strut element 5 is constructed to stably support the extension device 3 in the horizontal use position P2, such as a wide lie-flat bed position, on the cabin floor F. For example, the second free end 5.2 is configured to be positioned on the cabin floor F.

In the vertical stowed position P1 the bed surface side 3.2 is substantially hidden from view of the passenger O. In this position, the mounting side 3.1 is visible to the passenger O. For instance, the mounting side 3.1 comprises an optically appealing finish, such as a layer, a cover, a coating or the like which fits to a design of the aircraft cabin C. Moreover, the mounting side 3.1 may comprise a storage pocket 6, a mobile device holder or the like. The storage pocket 6 comprises a holding belt or strap 6.1 configured to secure items arranged inside the storage pocket 6.

Further, the mounting side 3.1 comprises a carrier device 7 to which the strut element 5 is pivotably coupled to. The carrier device 7 comprises a recess 7.1 corresponding with the shape, for example U-shape, O-shape or I-shape, of the strut element 5. The strut element 5 is fully arranged in the recess 7.1 when the extension device 3 is positioned in the vertical stowed position P1. The carrier device 7 may comprise the storage pocket 6. For example, the storage pocket 6 is arranged between the legs 5.3 of the strut element 5.

Moreover, the support structure 4 comprises a support linkage 8 configured to pivotably couple the extension device 3 to the support structure 4. Furthermore, the support structure 4 comprises at least a bracket 9 fixedly connected to a wall surface 2.1 of the cabin dividing element 2 to pivotably support the extension device 3 relative to the wall surface 2.1. As shown, the support structure 4 comprises two parallel aligned and spaced-apart brackets 9. The brackets 9 are fixed to a bottom side of the wall surface 2.1. In another embodiment, the brackets 9 may be fixed to the cabin floor F. Further, the support structure 4 comprises two parallel aligned and spaced-apart support linkages 8. Each of the support linkages 8 is pivotably hold in one of the brackets 9 and coupled to the extension device 3. In an embodiment, the wall surface 2.1 may comprise at least one no further shown cavity in which the extension device 3 may be arranged. When the extension device 3 is stowed, the extension device 3 and the wall surface 2.1 may provide a substantially flat vertical surface.

The support linkage 8 is coupled to each one of the extension device 3 and the support structure 4 via a pivot point PP1, PP2. Each lower pivot point PP1 is provided in the brackets 9. Each upper pivot point PP2 is provided on the mounting side 3.1 of the extension device 3. For example, the upper pivot points PP2 are provided by the carrier device 7.

Pivot points PP3 of the strut element 5 and each pivot point PP2 of the support linkages 8 are substantially arranged on the same pivot axis PA provided through the carrier device 7. In the shown embodiment, the pivot axis PA is arranged in a center area of the extension device 3. For example, the pivot axis PA is arranged perpendicular to the longitudinal axis a of the extension device 3. It is also possible to provide the pivot axis PA in a rear area or a front area of the extension device 3. The rear area is an area facing toward the wall surface and the front area is an area facing toward the passenger seating arrangement SA.

When the extension device 3 is pivoted from the vertical stowed position P1 to the horizontal use position P2, the strut element 5 is pivoted such that the strut element 5 is fully arranged outside the recess 7.1 of the carrier device 7. For example, the strut element 5 deploys by the rotation of the extension device 3. The strut element 5 may be coupled to the extension device 3 via a not further shown gear mechanism.

For example, a front side 3.3 of the extension device 3 comprises a flap 3.4 configured to be pulled by the passenger O to initiate movement, in particular rotation, of the extension device 3. A rear side 3.5 of the extension device 3 comprises a latch mechanism LM to latch the extension device 3 in the horizontal use position P2, as shown in FIG. 4D in more detail. Therefore, the wall surface 2.1 comprises a latch element 2.2 as shown in FIGS. 4A to 4D in more detail. The latch element 2.2 is one of a bar-like, ring, eyelet or loop element. The latch mechanism LM of the extension device 3 comprises a hook-like element 3.6, such as a claw latch, which is configured to detachably engage the latch element 2.2 arranged on the wall surface 2.1. The wall surface 2.1 comprises a cavity 2.3 in which the latch element 2.2 is arranged. It is also possible to provide the seat extension apparatus 1 with at least one motorized adjustment device which is configured to move the extension device 3 between the horizontal use position P2 and the vertical stowed position P1 automatically upon actuation e.g. via a remote control.

In the shown embodiment, the seat extension apparatus 1 comprises three extension devices 3 and corresponding supporting parts as described above. The extension devices 3 are arranged in a row, adjacent to each other in transverse direction of the aircraft cabin C. The passenger seating arrangement SA comprises therefore three single seats 10 arranged adjacent to each other in transverse direction of the aircraft cabin C. Each seat 10 comprises at least a seat cushion 10.1 and a backrest 10.2. Each seat 10 corresponds to one extension device 3 arranged in the front. Each passenger O of each seat 10 can use the respective extension device 3 as seat extension. In the horizontal use position P2, the front side 3.3 of the extension device 3 contacts the seat cushion 10.1 such that the bed surface side 3.2 of the extension device 3 and the seat cushion 10.1 together form the seat extension, such as a bed extension.

Further, the passenger seating arrangement SA comprises a number of pivotable armrests 11, 11' arranged between two seats 10. In an exemplary arrangement of three seats 10 arranged side by side, i.e. adjacent to each other in a transverse direction of the cabin C, the arrangement may comprise four armrests 11 to 11". For example, outer side armrests 11" are fixed to outer sides of outer seats 10 facing in a direction e.g. toward a cabin aisle. The outer side armrests 11" may be pivotable or non-pivotable. Each armrest 11 and 11" having a stowable tray table 12. In this arrangement, only one pivotable armrest 11 with a stowable tray table 12 arranged inside the pivotable armrest 11 is enough. The pivotable armrest 11 provides the tray table 12 for a center seat 10 arranged between two outer seats 10. For better understanding, the outer seats 10 will be given an additional reference sign 10'. The center seat 10 will be given an additional reference sign 10".

As shown, each of the pivotable armrests 11, 11' is arranged between two adjacent seats 10. When the tray table 12 is vertically stowed and the armrest 11 is in the deployed use position P3, as shown in FIG. 1A, the deployed armrest 11 can be used as a seating area dividing element.

The armrests 11, 11' are movable between a retracted stowed position P4, as exemplarily shown in FIG. 1B, in which the armrests 11 are arranged substantially alongside a side surface of the backrests 10.2, and the deployed use position P3, in which the armrests 11 are arranged substantially parallel and above the seat cushions 10.1. In each of the deployed use position P3 and the retracted stowed position P4 each armrest 11 is locked. To release the lock, a commonly known release button connected to a lock mechanism of the armrest 11 may be provided on the armrest 11 and pushed. When the armrests 11 are locked in the retracted stowed position P4 the passenger seating arrangement SA, in particular all seats 10, turn into a divan bed. In particular, seat cushion surfaces of each seat cushion 10.1 are in contact with each other such that the seat cushion surfaces form a unitary sitting (bench-like) and bed surface along the passenger seating arrangement SA.

Figure 2:
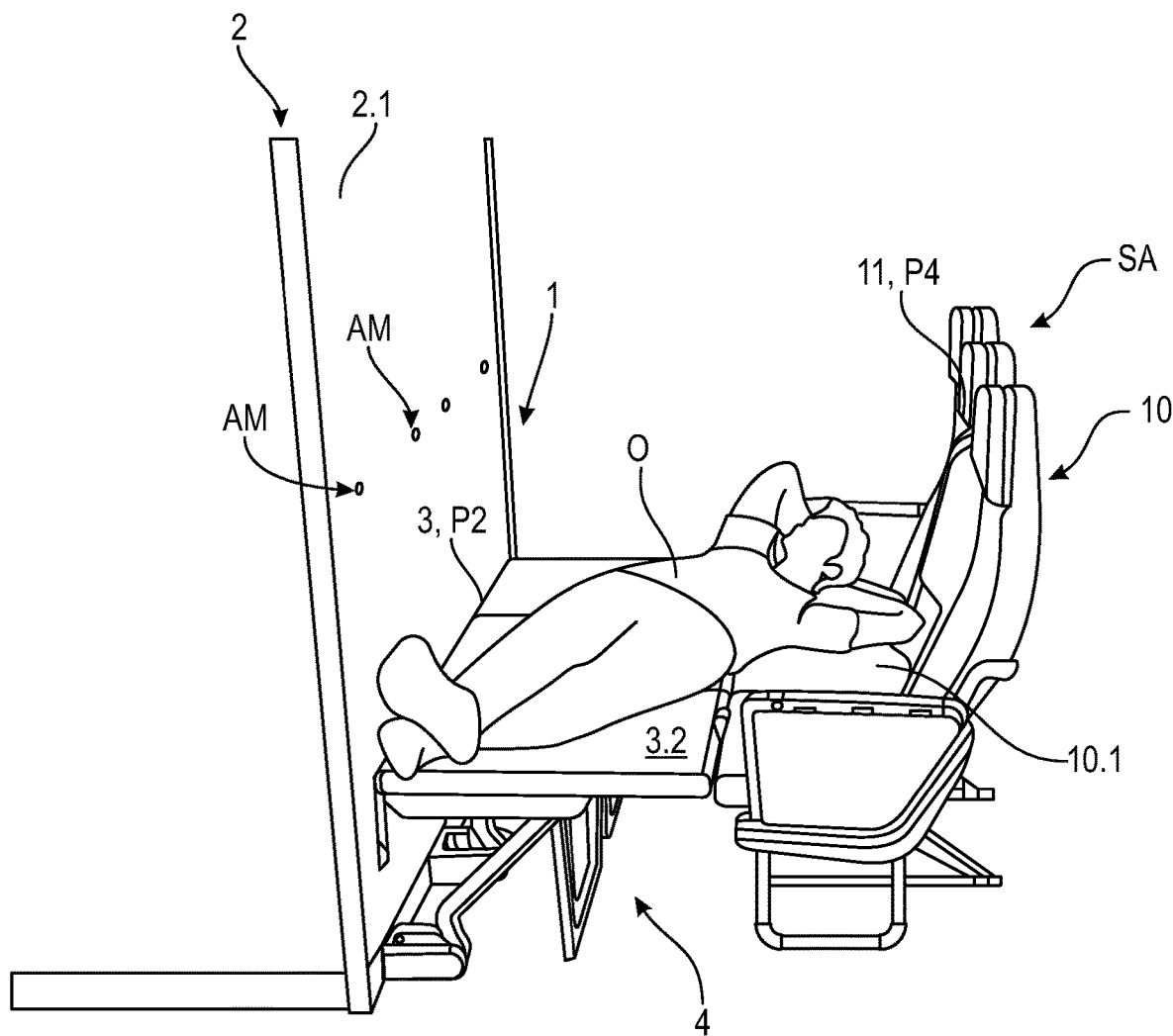
FIG. 2 shows a perspective view of an embodiment of a converted seat extension apparatus creating a wide lie-flat bed surface with a passenger seating arrangement, in accordance with an example.

FIG. 2 shows a perspective view of an embodiment of a converted seat extension apparatus 1 creating a wide lie-flat bed surface with the passenger seating arrangement SA. For example, this wide lie-flat bed surface may be used by one single passenger O or by more than one passenger O on each corresponding seat 10.

Figure 3:
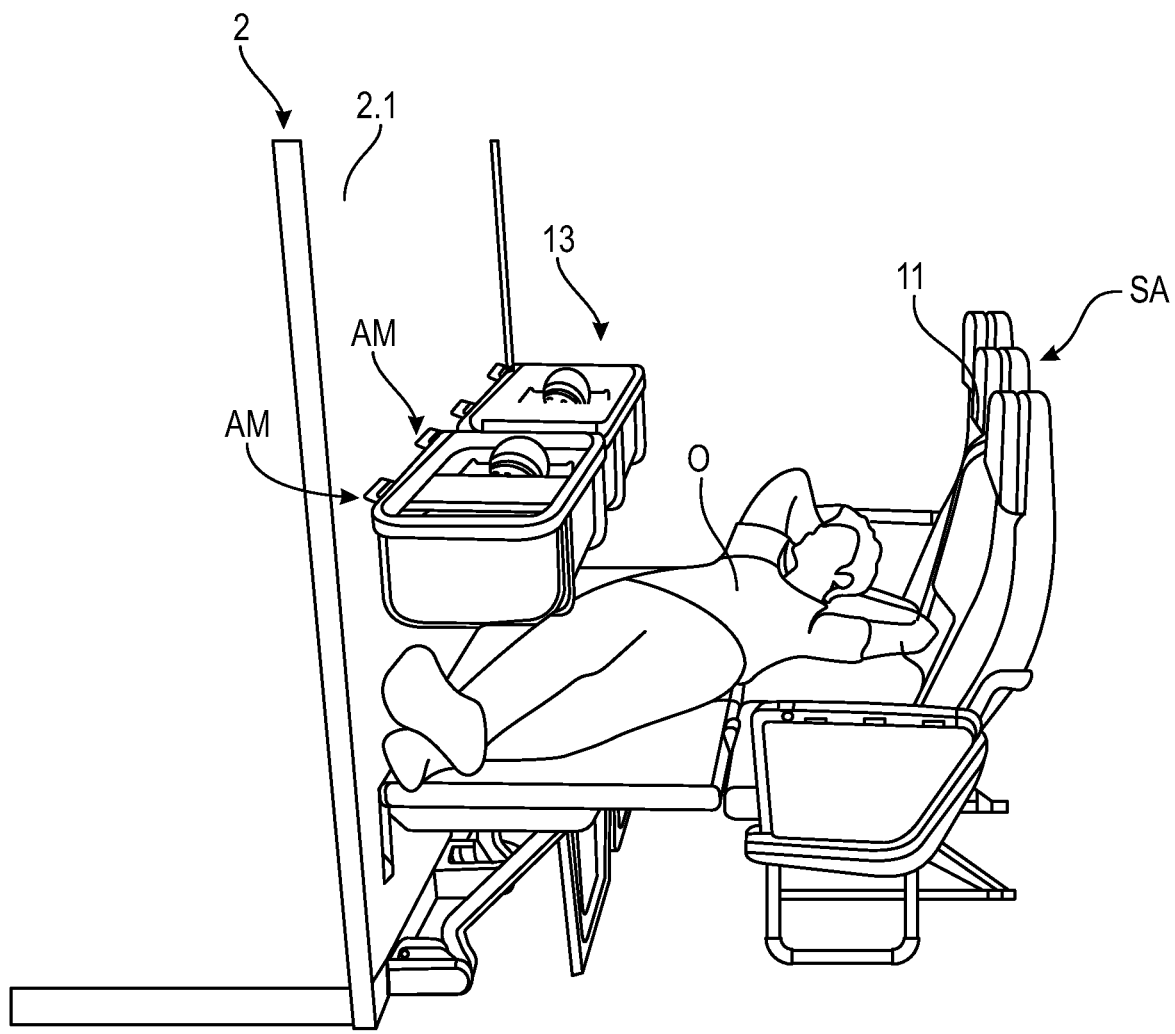
FIG. 3 shows a perspective view of an embodiment of a cabin dividing element comprising an attachment mechanism for a bassinet, in accordance with an example.

FIG. 3 shows a perspective view of an embodiment of a cabin dividing element 2 comprising an attachment mechanism AM, as shown in FIG. 2, for a bassinet 13. In particular, the wall surface 2.1 comprises the attachment mechanism AM for the bassinet 13.

Figure 4A:
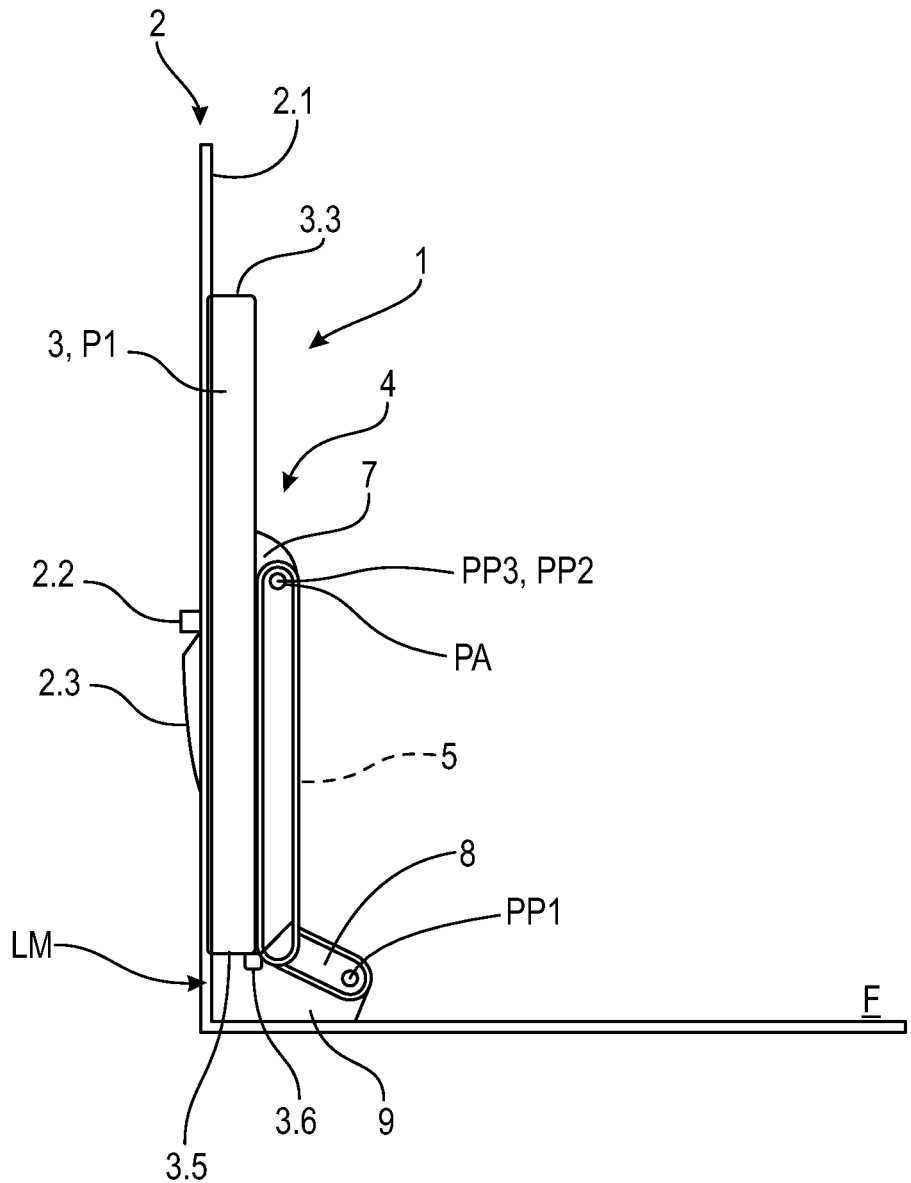
FIGS. 4A to 4D show schematically in side views an embodiment of the seat extension apparatus and a conversion of the seat extension apparatus from a vertical stowed position to a horizontal use position, in accordance with an example.
Figure 4B:
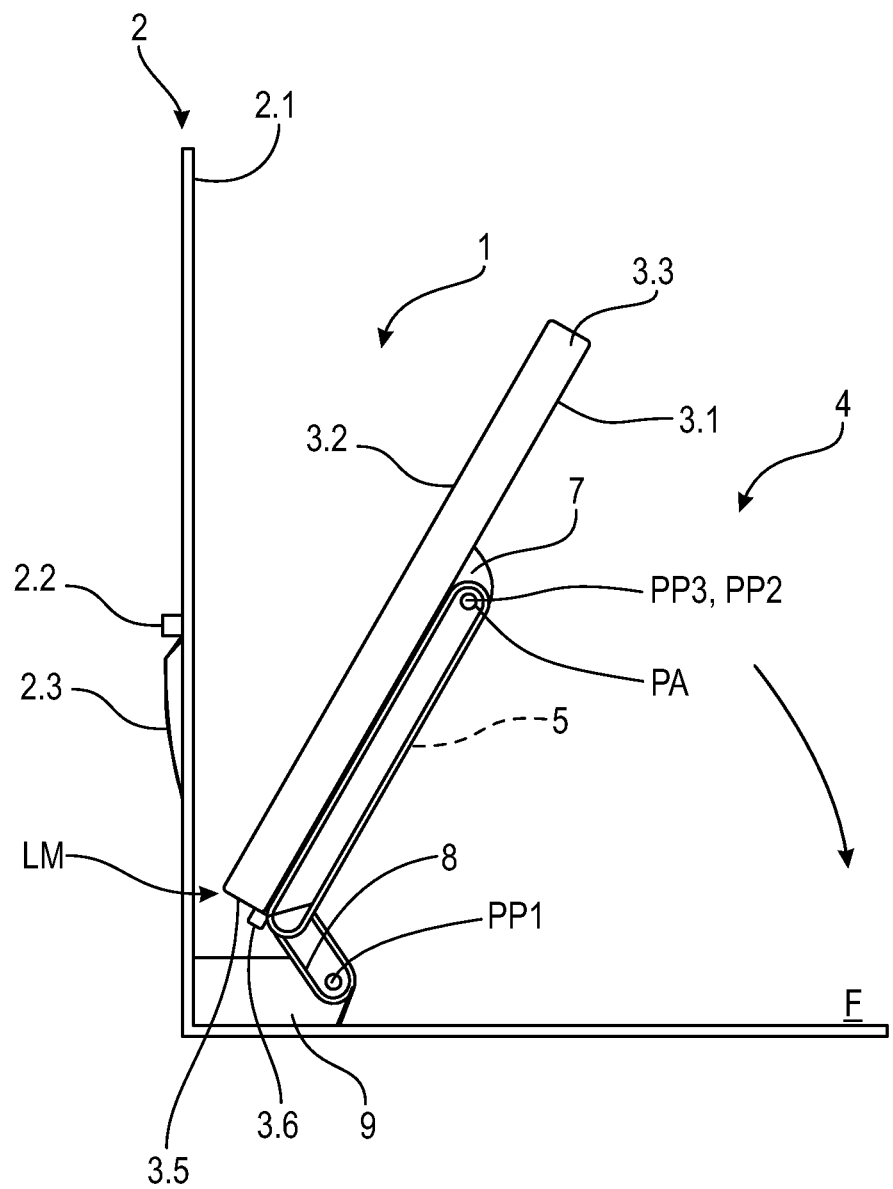
Figure 4C:
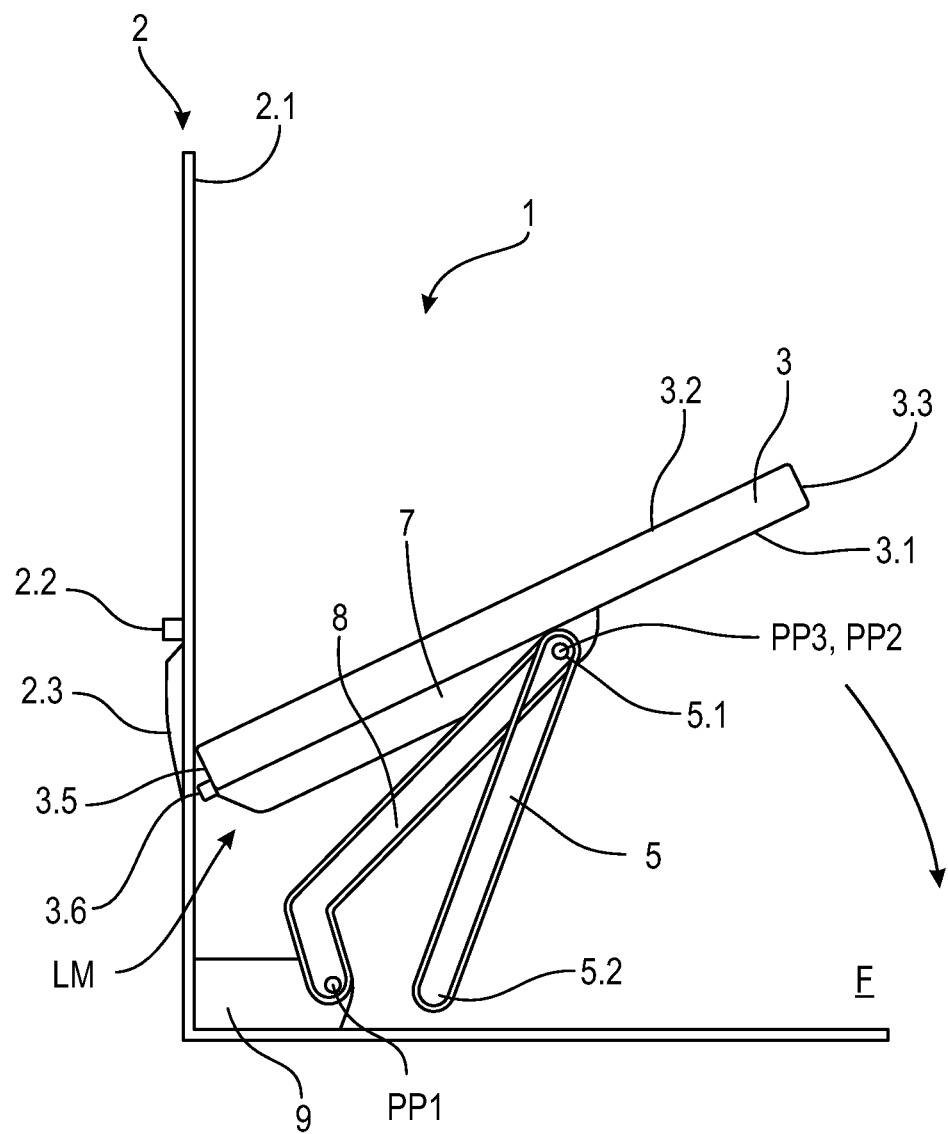
Figure 4D:
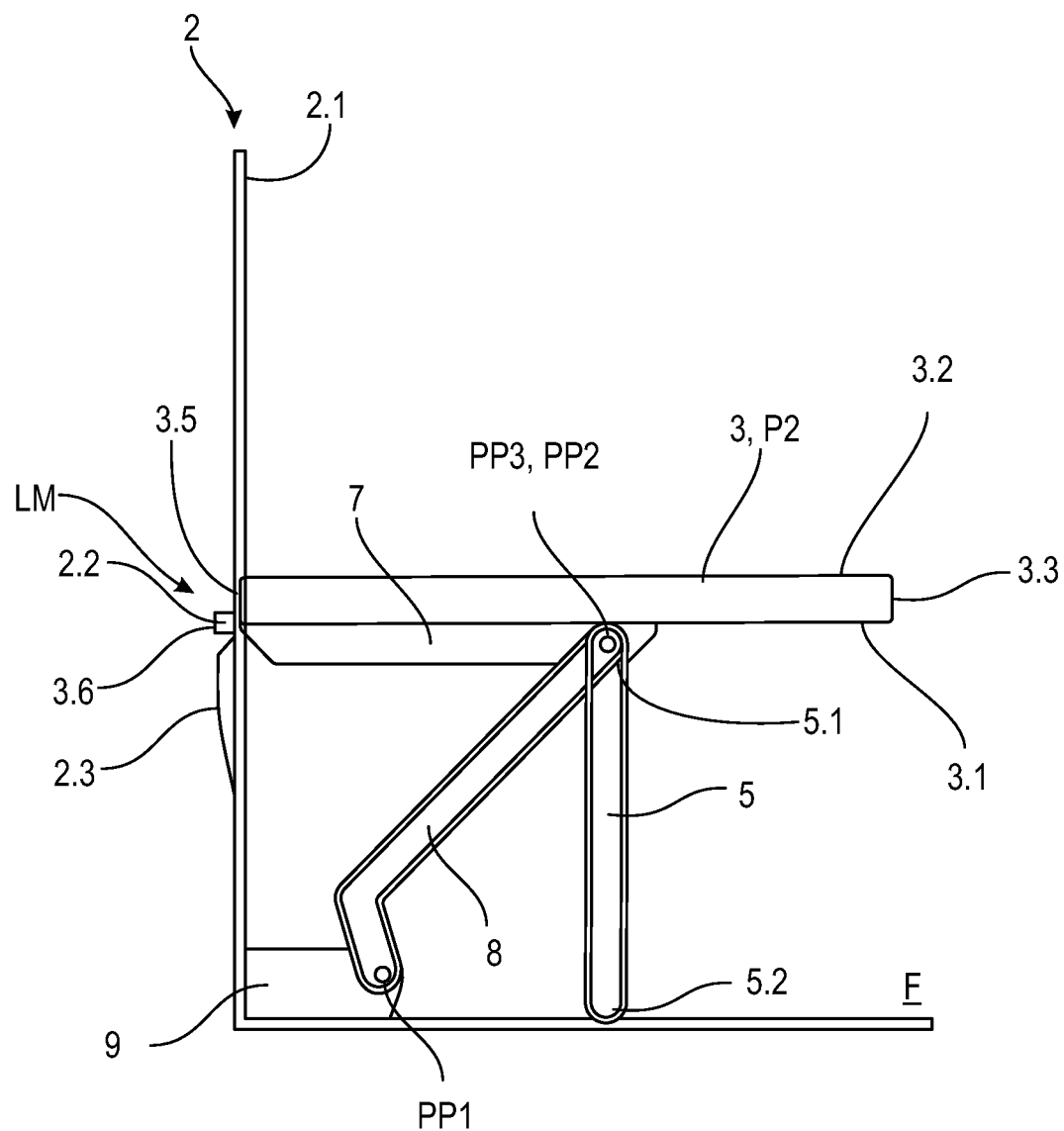

FIGS. 4A to 4D schematically show the seat extension apparatus 1 and a conversion of the seat extension apparatus 1 from a vertical stowed position P1 to a horizontal use position P2. In particular, FIG. 4A shows the extension device 3 in the vertical stowed position P1, FIG. 4B shows the extension device 3 in a slightly pivoted forward position from the stowed position P1 in a direction to the horizontal use position P2, FIG. 4C shows the extension device 3 in a pivoted position close to the horizontal use position P2 and FIG. 4D shows the extension device 3 in the horizontal use position P2.

FIGS. 5A to 5E show in perspective views an embodiment of a passenger seating arrangement SA comprising at least one pivotable armrest 11 having a stowable tray table 12. The tray table 12 is configured as a bi-fold table. The armrest 11 comprises a slot 11.1, for example in form of a through hole, through which the tray table 12 can be moved in a bi-folded state. Alternatively, the tray table 12 is configured as a single shelf.

Figure 5A:
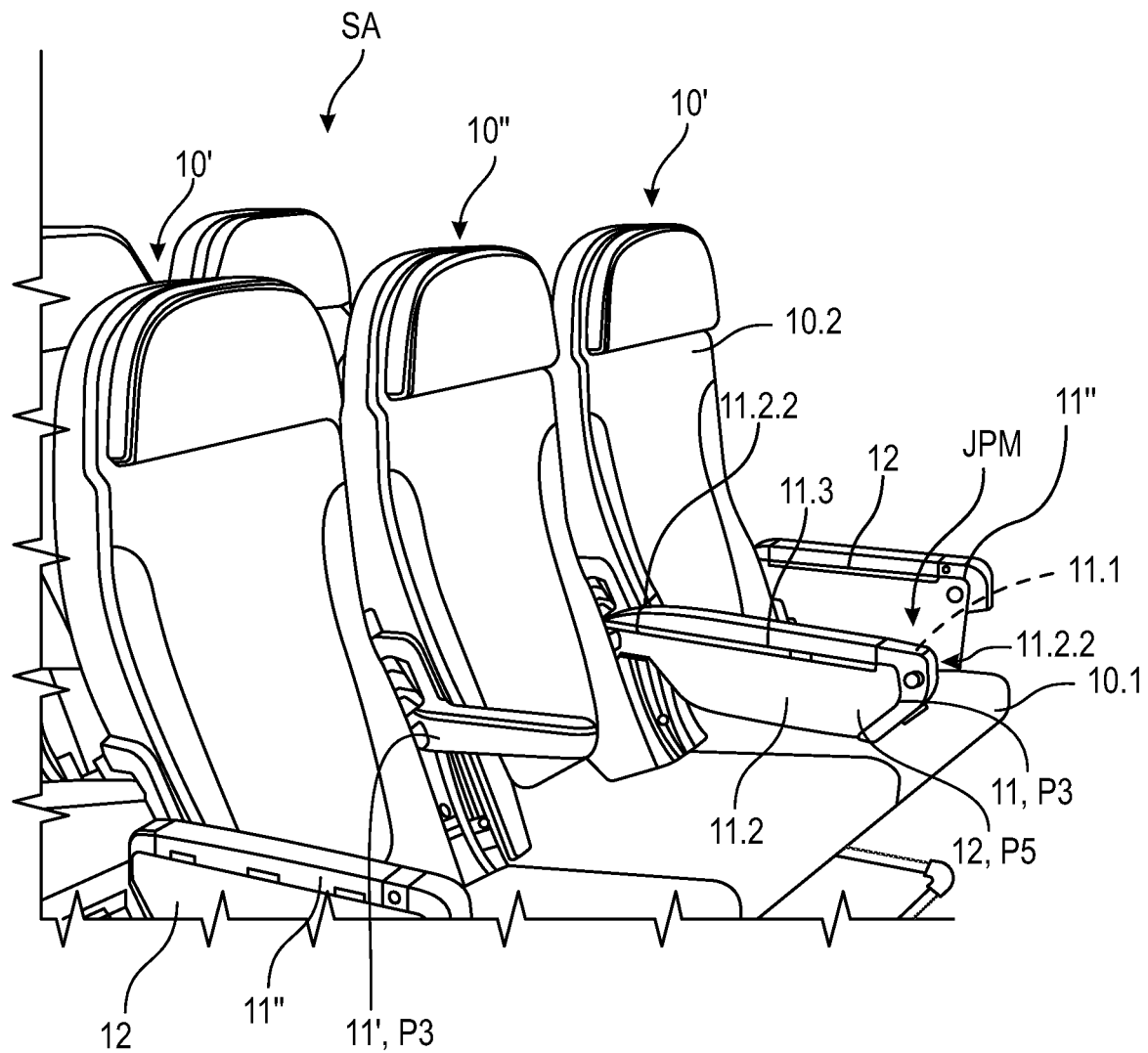
FIGS. 5A to 5F show in perspective views an embodiment of a passenger seating arrangement comprising at least one pivotable armrest having at least one stowable tray table, in accordance with an example.
Figure 5B:
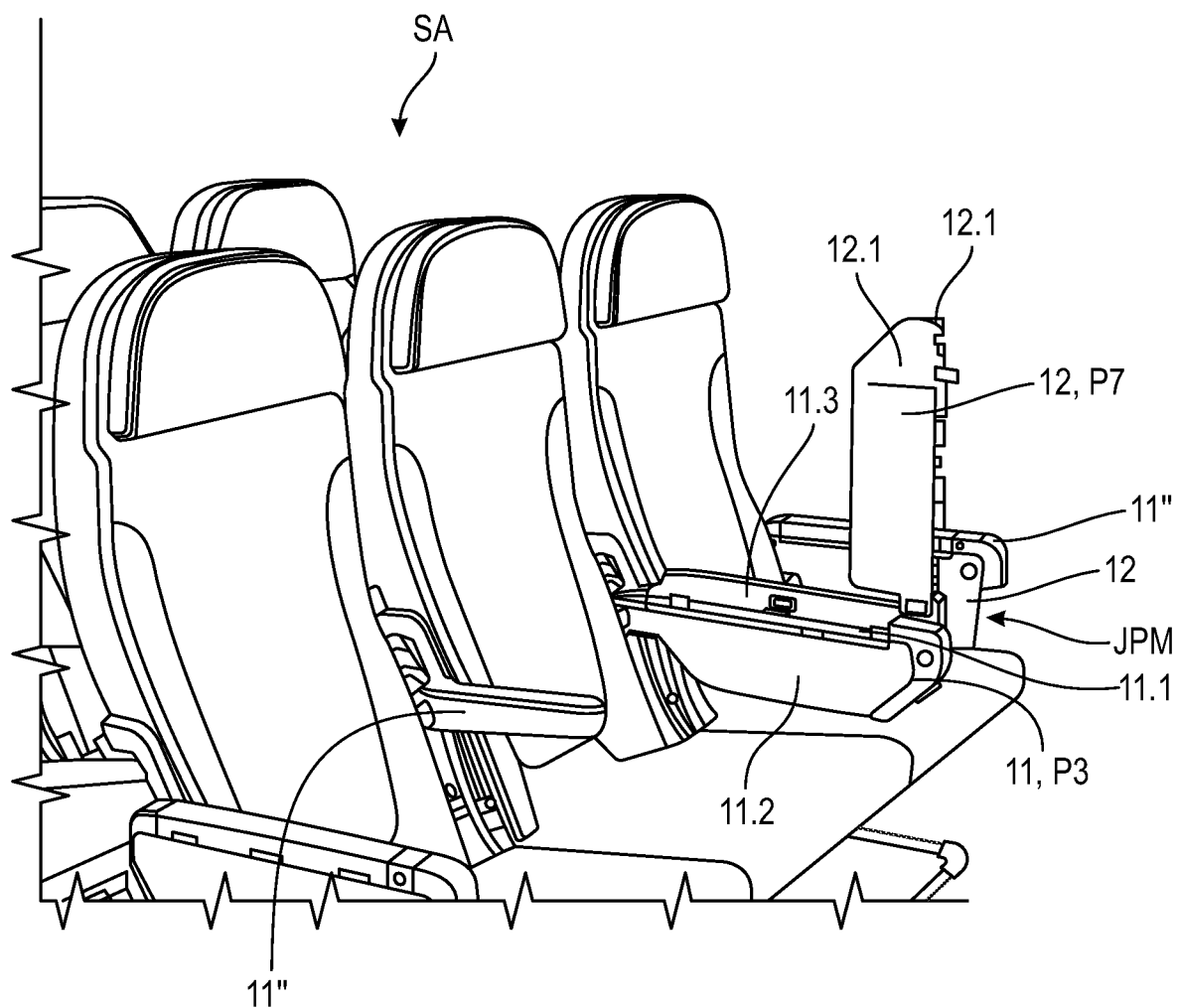
Figure 5C:
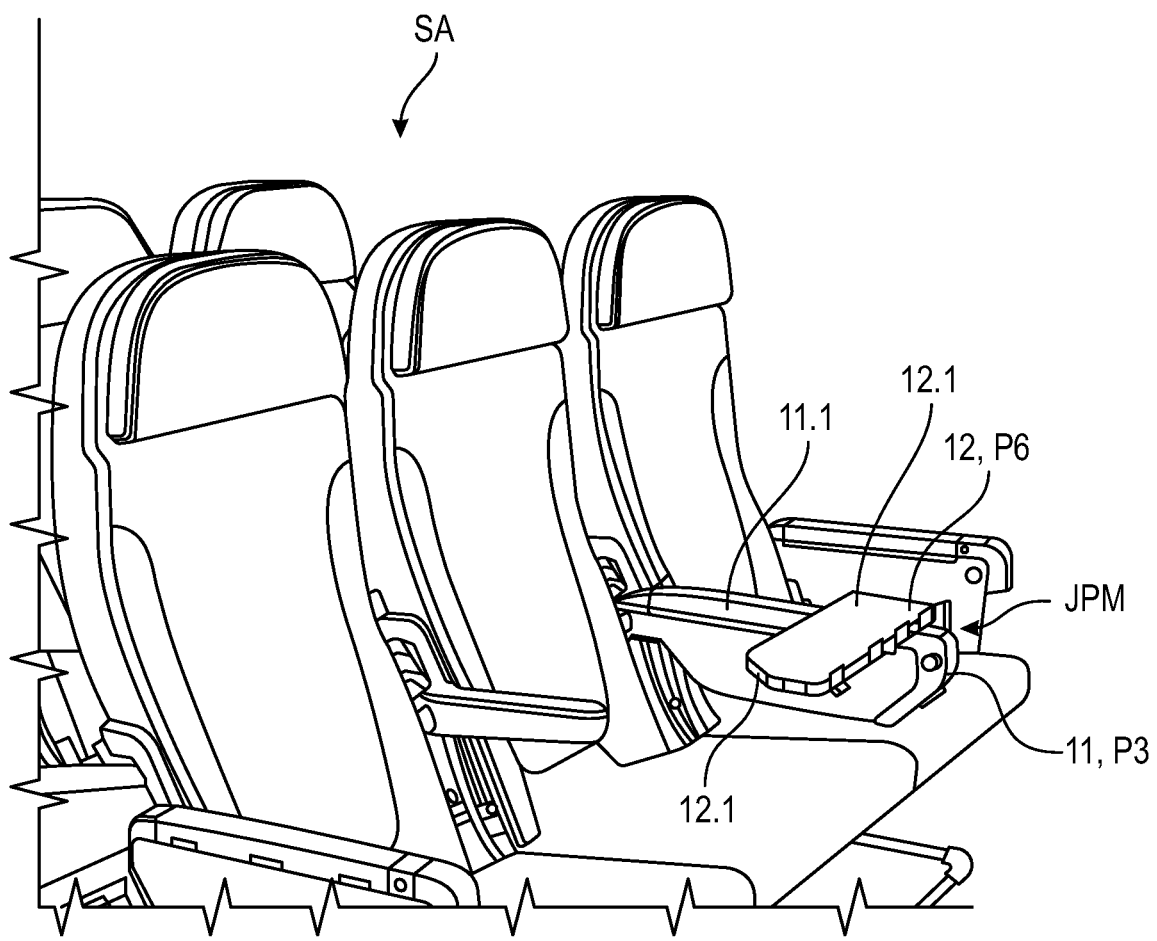
Figure 5D:
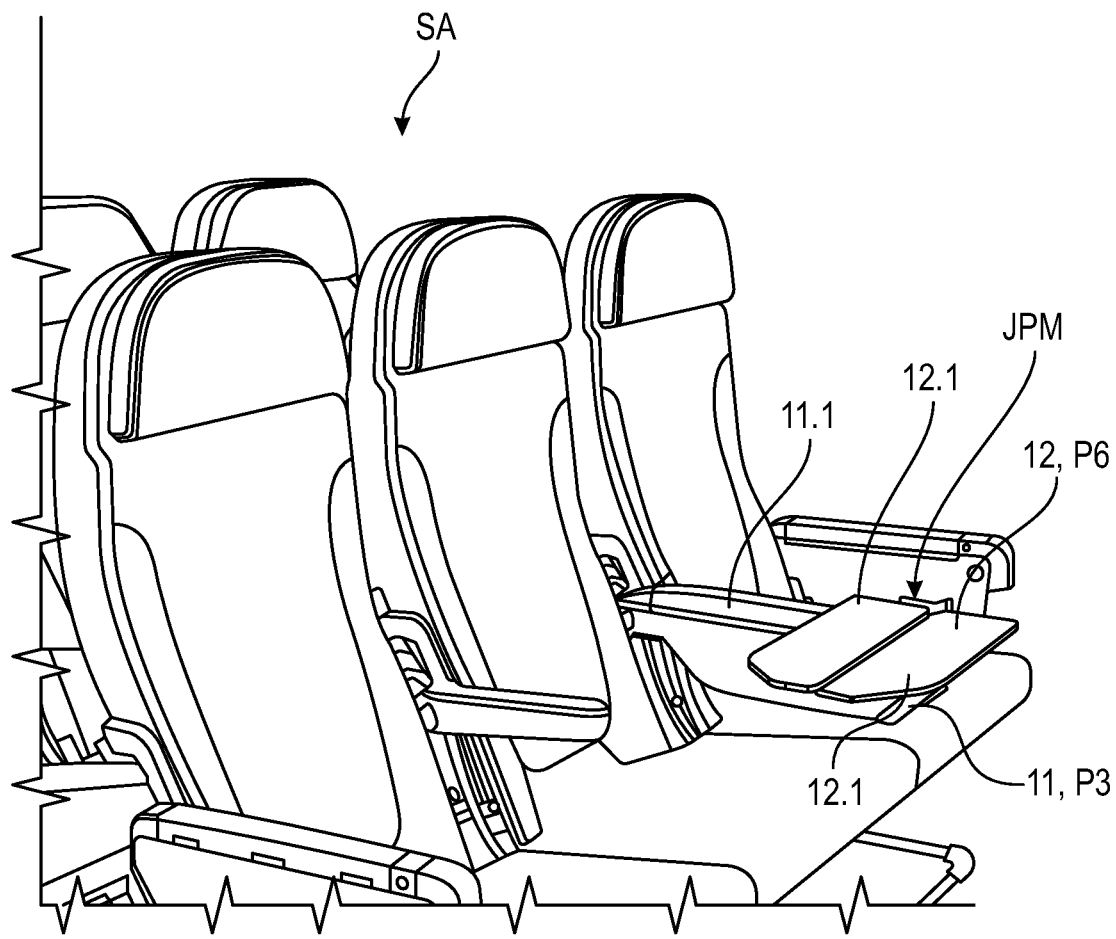
Figure 5E:
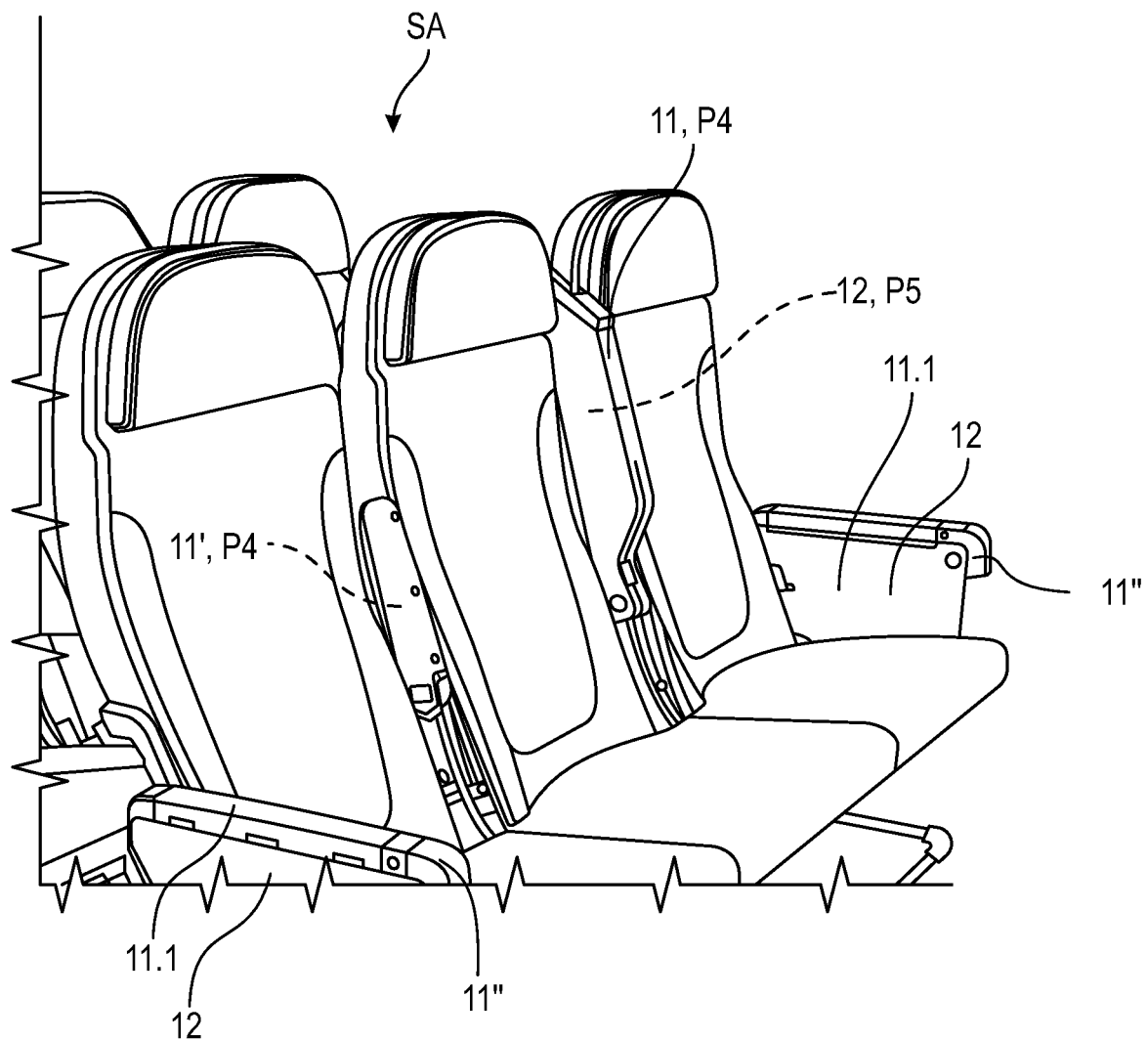
Figure 5F:
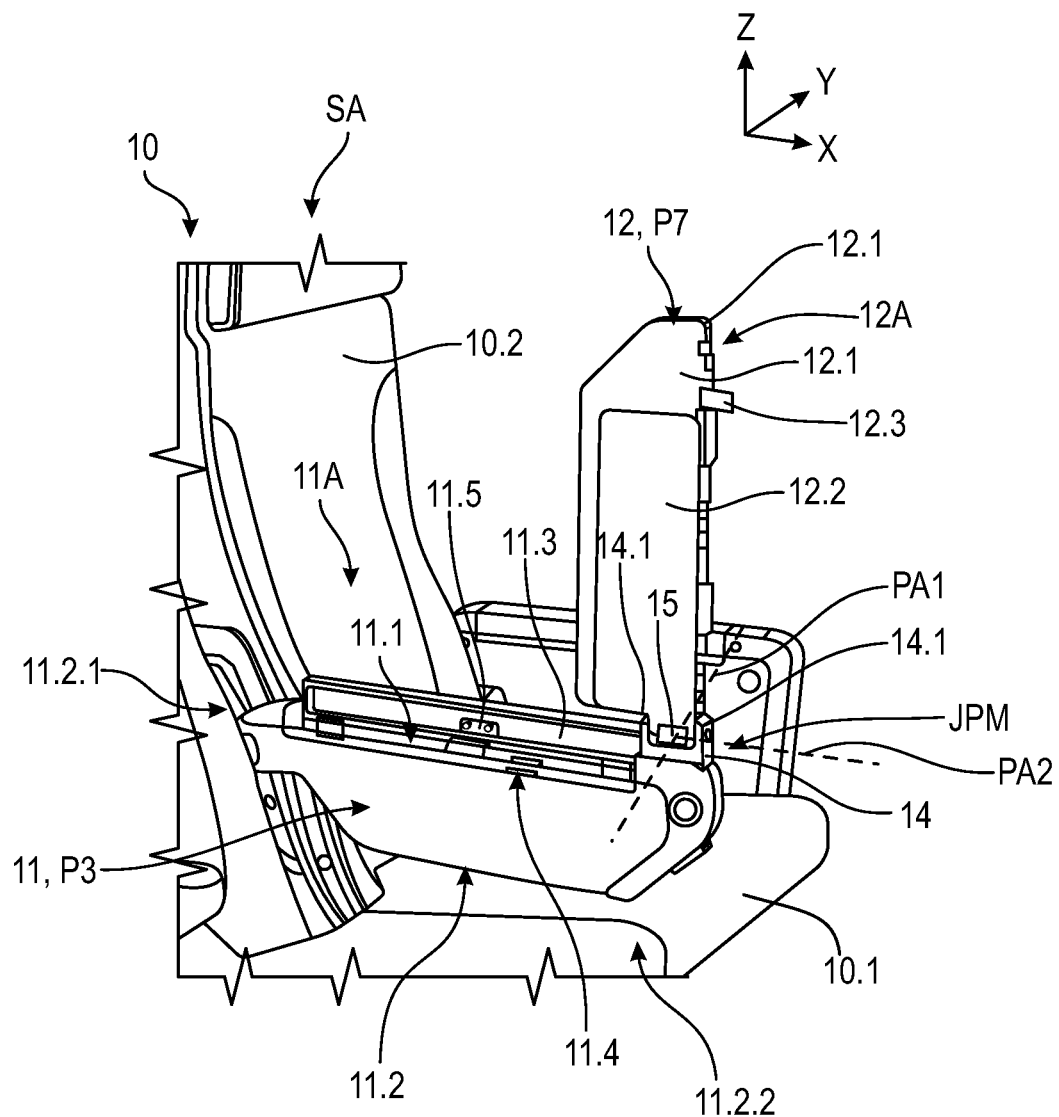

In particular, FIG. 5A shows each of the armrests 11 and 11' arranged above and substantially parallel to the seat cushion 10.1, each armrest 11 and 11' being positioned in the deployed use position P3, wherein a tray table 12 is arranged within the armrest 11 and is stowed inside the armrest 11, the tray table 12 being arranged in a vertical position P5. FIG. 5B shows the armrest 11 with an open lid 11.3 and a tray table 12 which is moved out from the inside of the armrest 11, FIGS. 5C and 5D show the armrest 11 with the tray table 12 in a horizontal position P6 and FIG. 5E shows the armrests 11 and 11' in the retracted stowed position P4. FIG. 5F shows an enlarged section of the seating arrangement SA according to FIG. 5B.

For example, the seating arrangement SA comprises three seats 10, two outer side seats 10' and one center seat 10" arranged between the outer side seats 10'. The seating arrangement SA further comprises four armrests 11 to 11", two outer side armrests 11" and two inner side armrests 11 and 11'. Each of the inner side armrests 11 and 11' is arranged between one of the outer side seats 10' and the center seat 10". Therefore, each seat 10, 10' to 10" comprises two armrests 11 to 11" which may be used. The outer side armrests 11" comprise stowable tray tables 12 for passengers of the outer side seats 10'. One of the inner side armrests 11 comprises a tray table 12 for a passenger of the center seat 10".

In an arrangement of two seats 10, it is possible to provide pivotable armrests 11 with tray tables 12 on outer sides of the seats 10. Between the two seats 10 one pivotable armrest 11 without a tray table 12 may be arranged.

The armrest 11 is pivotable mounted to a backrest 10.2, such as a backrest 10.2 frame structure.

The tray table 12 may be coupled to the armrest 11 via an easy hinge or joint and pivot mechanism JPM. In particular, from a vertically stowed state of the bi-folded tray table 12, wherein the tray table 12 is guided through the slot 11.1 of the armrest 11 in a vertical manner. The tray table 12 can be pivoted vertically upwards about the joint and pivot mechanism JPM to be moved from the stowed state, in particular the vertical position P5, into an intermediate deployed position P7 as shown in FIG. 5B. Afterwards, the tray table 12 can be folded down about the joint and pivot mechanism JPM in a direction towards the seat cushion 10.1 till the tray table 12 reaches a fully horizontal position P6. The bi-folded tray table 12 can now be unfolded providing a wider table surface.

According to an embodiment, the tray table 12 is configured as a bi-fold table; for example the tray table 12 comprises two tabletops 12.1 which are hinged to each other such that the two tabletops 12.1 can be folded one above the other. The armrest 11 comprises the slot 11.1 in which the tray table 12 may be fully stowed when not needed. The armrest 11 comprises a casing 11.2 which corresponds to the tray table 12 in its bi-folded shape. The casing 11.2 comprises an attachment section 11.2.1 which is pivotable mounted to the seat 10, for example to the center seat 10" and/or to the corresponding outer side seat 10'. The casing 11.2 further comprises a main section 11.2.2 for the passenger. In the main section 11.2.2, the lid 11.3, the tray table 12 and the joint and pivot mechanism JPM are arranged being easy to reach for the passenger. For example, the casing 11.2 is configured such that dimensions of the main section 11.2.2 are larger than dimensions of the attachment section 11.2.1.

In an area of the slot 11.1, the armrest 11 comprises the lid 11.3 which is hinged on the area of the slot 11.1 to cover up the slot 11.1. The lid 11.3 is arranged on an upper surface side of the armrest 11. For example, the lid 11.3 is arranged on the upper surface side of the casing 11.2. Even if the tray table 12 is deployed into a state above a passenger's lap, the lid 11.3 may cover the slot 11.1. Therefore, the joint and pivot mechanism JPM may be arranged outside the slot 11.1 and a lid covering area. The joint and pivot mechanism JPM is arranged on the upper surface side of the armrest 11, for example of the casing 11.2. In particular, FIG. 5A shows the tray table 12 in a stowed state within the armrest 11. FIG. 5B shows the tray table 12 in a vertically deployed and upward directed state. FIG. 5C shows the tray table 12 in a folded down horizontal state. FIG. 5D shows the tray table 12 in a flipped opened state, wherein the tabletops 12.1 form a wider table surface. FIG. 5E shows the armrest 11 in a retracted stowed position P4, wherein the tray table 12 is stowed within the armrest casing 11.2. For instance, in case of a three-wide passenger seating arrangement SA as shown, there is only one armrest 11 with a stowable tray table 12 needed providing a table surface for a center seat 10" of the three-wide passenger seating arrangement SA. As exemplary marked in FIG. 5E, armrests 11 of the outer seats 10' each comprise a stowable tray table 12. Thereby, a second center armrest 11' may be configured as a common pivotable armrest 11'.

FIG. 5F shows an enlarged section of the passenger seating arrangement SA. For example, the passenger seating arrangement SA comprises an armrest apparatus 11A comprising a tray table apparatus 12A. The armrest apparatus 11A comprises the casing 11.2 configured to receive and retain the tray table apparatus 12A. The tray table apparatus 12A comprises the tray table 12 and the joint and pivot mechanism JPM. The joint and pivot mechanism JPM is configured to connect the tray table apparatus 12A to the armrest apparatus 11A. Further, the armrest apparatus 11A comprises the main section 11.2.2 and the attachment section 11.2.1. In the main section 11.2.2, the casing 11.2 of the armrest apparatus 11A comprises the slot 11.1 to receive the tray table apparatus 12A. The tray table apparatus 12A is arranged in the main section 11.2.2 of the armrest apparatus 11A.

The slot 11.1 is configured as a vertical recess provided in the casing 11.2. In the stowed vertical position P5 of the tray table apparatus 12A, the tray table 12 of the tray table apparatus 12A is fully arranged inside the slot 11.1 so as inside the casing 11.2 protected from external influences. The slot 11.1 is open at a top of the casing 11.2 facing in a direction toward the cabin ceiling. The armrest apparatus 11A further comprises the lid 11.3. One side of the lid 11.3 is hinged to the casing 11.2 in the area of the slot 11.1. Another side of the lid 11.3 can be latched to the casing 11.2 when the lid 11.3 is arranged above the slot 11.1 to cover said slot 11.1. The casing 11.2 comprises a latch element 11.4 arranged in the area of the slot 11.1 on an opposite side of a hinge 11.5 of the lid 11.3. The latch element 11.4 may comprise a clip-function, snap-function or any other engagement function to secure the lid 11.3 in a closed position to the casing 11.2.

The joint and pivot mechanism JPM is arranged outside of the lid covering area. The joint and pivot mechanism JPM may be arranged in the slot 11.1 in an area which is not covered by the lid 11.3. The joint and pivot mechanism JPM comprises a first hinge element 14. The first hinge element 14 is pivotable coupled to armrest apparatus 11A, for example the casing 11.2. The first hinge element 14 is pivotable about a first pivot axis PA1 extending parallel to a transverse axis y of the cabin C. The joint and pivot mechanism JPM comprises a second hinge element 15. The second hinge element 15 is pivotable about a second pivot axis PA2 extending parallel to a longitudinal axis x of the cabin C. The pivot axes PA1 and PA2 are extending substantially perpendicular to each other. The second hinge element 15 is pivotable coupled to the first hinge element 14. Further, the second hinge element 15 couples the tray table 12 to the first hinge element 14. The first hinge element 14 is, for example, substantially U-shaped. The second hinge element 15 is arranged between legs 14.1 of the first hinge element 14. A connection region of the legs 14.1 is pivotable coupled to the casing 11.2. Via the first pivot axis PA1, the tray table 12 is movable from the slot 11.1. For example, via the first pivot axis PA1, the tray table 12 is pivotable between the stowed vertical position P5 and the intermediate deployed position P7. Via the second pivot axis PA2, the tray table 12 is movable toward the seat cushion 10.1. For example, via the second pivot axis PA2, the tray table 12 is pivotable between the intermediate deployed position P7 and the horizontal position P6.

The tray table apparatus 12A further comprises a table support 12.2. The table support 12.2 is configured as a bracket or holder element to movably support the tray table 12. The tray table 12 is attached to the table support 12.2. For example, one of the two tabletops 12.1 is attached to the table support 12.2.

Moreover, the tray table 12 comprises a pull-out flap 12.3. The pull-out flap 12.3 is arranged in an area of a hinge connection of the two tabletops 12.1. The pull-out flap 12.3 allows a simple operation to move the tray table 12 out from the slot 11.1, i.e. from the stowed vertical position P5 to the intermediate deployed position P7.

It is understood that the outer side armrests 11" also may be configured from an armrest apparatus 11A comprising a tray table apparatus 12A as described above.

Figure 6:
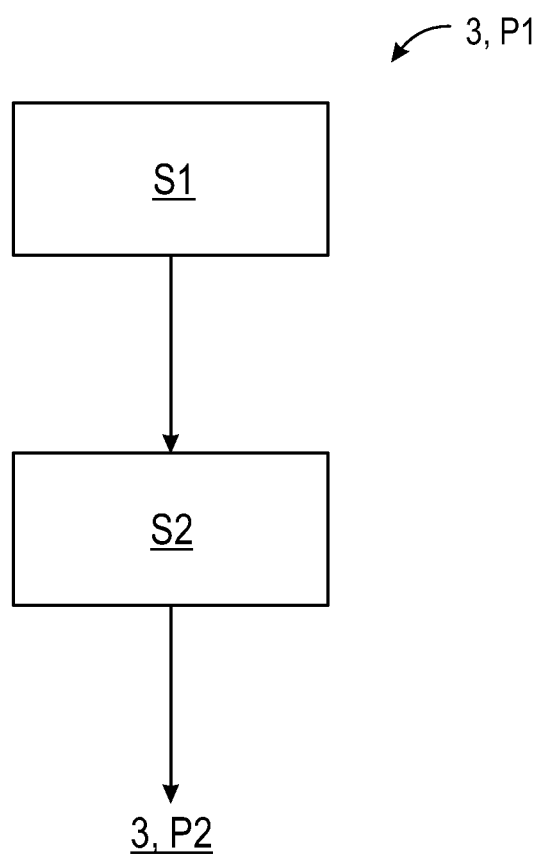
FIG. 6 shows a flow chart of a method of deploying a seat extension apparatus, in accordance with an example.

FIG. 6 shows a flow chart of a method of deploying a seat extension apparatus 1, wherein the method comprises at least two steps S1 and S2. For example, the seat extension apparatus 1 is coupled to a cabin dividing element 2. The seat extension apparatus 1 comprises an extension device 3 having a mounting side 3.1 and a bed surface side 3.2. The extension device 3 is movable between a vertical stowed position P1 and a horizontal use position P2. Further, the seat extension apparatus 1 comprises a support structure 4 coupled to the extension device 3 to pivotably support the extension device 3 on the cabin dividing element 2. The support structure 4 comprises a pivotable strut element 5 having at least one end 5.1 pivotably coupled to the mounting side 3.1 of the extension device 3 and at least one free end 5.2 which, when located on a cabin floor F, supports the extension device 3 in the horizontal use position P2. A first step S1 comprises moving the extension device 3 from the vertical stowed position P1 in a direction toward the horizontal use position P2. That means that in the first step S1, the extension device 3 moves, e.g. pivots, from the vertical stowed position P1 in a direction away from the cabin dividing element 2. A second step S2 comprises pivoting the support structure 4 such that the strut element 5 moves from a substantially parallel orientation relative to the extension device 3 to a substantially perpendicular or angled orientation relative to the extension device 3. That means that in the second step S2, the strut element 5 pivots in a direction away from the cabin dividing element 2 toward the cabin floor F. A third step may comprise positioning at least one free end 5.2 of the strut element 5 on the cabin floor F and the extension device 3 in the horizontal use position P2. That means that when the strut element 5 stands on the cabin floor F, e.g. when the free end 5.2 reaches the cabin floor F, the extension device 3 is fully positioned in the horizontal use position P2. A not further shown step, for example between the second step S2 and the third step or after the third step, may comprise latching the extension device 3 to the cabin dividing element 2.

Further, the disclosure comprises embodiments according to the following clauses:

A seat extension apparatus (1) for a cabin dividing element (2), in particular of an aircraft cabin, the seat extension apparatus comprising at least:
  an extension device having a mounting side and a bed surface side, wherein the extension device is movable between a vertical stowed position and a horizontal use position, and
  a support structure coupled to the extension device to pivotably support the extension device, wherein the support structure comprises at least one pivotable strut element having an end pivotably coupled to the mounting side of the extension device and a free end, wherein
  in the vertical stowed position of the extension device the strut element is arranged substantially parallel to a longitudinal axis of the extension device, and
  in the horizontal use position of the extension device the strut element is arranged substantially perpendicular or angled to the longitudinal axis of the extension device.

The seat extension apparatus according to clause 1, wherein the mounting side of the extension device comprises at least one carrier device to which the strut element is pivotably coupled to.

The seat extension apparatus according to clause 2, wherein the carrier device comprises at least one recess into which the strut element is fully arranged when the extension device is in the vertical stowed position.

The seat extension apparatus according to clause 2 or 3, wherein the carrier device comprises at least one storage pocket.

The seat extension apparatus according to clause 1, wherein the strut element is U-shaped.

The seat extension apparatus according to clause 1, wherein the support structure comprises at least one support linkage configured to pivotably couple the extension device to the support structure.

The seat extension apparatus according to clause 6, wherein the support linkage is coupled to each one of the extension device and the support structure via a pivot point.

The seat extension apparatus according to clause 7, wherein a pivot point of the strut element and the pivot point of the support linkage are substantially arranged on the same pivot axis.

The seat extension apparatus according to clause 8, wherein the pivot axis is arranged in a center area of the extension device and perpendicular to the longitudinal axis of the extension device.

The seat extension apparatus according to clause 3, wherein when the extension device is pivoted from the vertical stowed position to the horizontal use position, the strut element is pivoted such that the strut element is fully arranged outside the recess of the carrier device.

The seat extension apparatus according to clause 1, wherein a rear side of the extension device comprises at least one latch mechanism to latch the extension device in the horizontal use position.

A cabin dividing element for an aircraft cabin, in particular arranged in front of a passenger seating arrangement, the cabin dividing element comprising at least:
  a wall surface and
  a seat extension apparatus according to the preceding clauses 1 to 11, wherein the seat extension apparatus is coupled to the wall surface.

The cabin dividing element according to clause 12, wherein the support structure comprises at least a bracket fixedly connected to the wall surface to pivotably support the extension device relative to the wall surface.

The cabin dividing element according to clause 12 or 13, wherein the wall surface comprises a latch element for the latch mechanism of the seat extension apparatus so that the extension device is latched to the wall surface in the horizontal use position.

The cabin dividing element according to any one of the clauses 12 to 14, wherein the wall surface comprises an attachment mechanism for at least one bassinet.

An aircraft cabin comprising at least:
  a passenger seating arrangement,
  a cabin dividing element according to the preceding clauses 12 to 15, wherein the cabin dividing element is arranged in front of the passenger seating arrangement.

The aircraft cabin according to clause 16, wherein the passenger seating arrangement comprises at least one pivotable armrest having at least one stowable tray table.

The aircraft cabin according to clause 17, wherein the armrest is movable between a retracted stowed position, in which the armrest is arranged substantially alongside a side surface of a backrest of the passenger seating arrangement, and a deployed use position, in which the armrest is arranged substantially parallel and above a seat cushion of the passenger seating arrangement.

The aircraft cabin according to clause 18, wherein when the extension device is positioned in the horizontal use position the bed surface side of the extension device is in alignment with a seat surface of the passenger seating arrangement.

A method of deploying of a seat extension apparatus of the cabin dividing element of clause 16, comprising:
  moving the extension device from the vertical stowed position to the horizontal use position;
  pivoting the support structure such that the strut element moves from the substantially parallel orientation to the substantially perpendicular or angled orientation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat extension apparatus for a cabin dividing element of an aircraft cabin, the seat extension apparatus comprising:
   an extension device having a mounting side and a bed surface side extending between a rear side and a front side along a longitudinal axis of the extension device, wherein the extension device is pivotably movable between a vertical stowed position parallel to the cabin dividing element and a horizontal use position perpendicular to the cabin dividing element at a horizontal height above a cabin floor, and
   a support structure coupled to the extension device configured to support the extension device when in the horizontal use position, wherein the support structure comprises at least one pivotable strut element having at least one end pivotably coupled to the mounting side of the extension device and at least one free end,
   wherein, in the vertical stowed position of the extension device, the strut element is arranged substantially parallel to the longitudinal axis of the extension device, and the front side is located above the horizontal height and the rear side is located below the horizontal height, and
   wherein, in the horizontal use position of the extension device, the strut element is arranged substantially perpendicular or angled to the longitudinal axis of the extension device, and the front side is distal to the cabin dividing element relative to the rear side.

2. The seat extension apparatus according to claim 1, wherein the mounting side of the extension device comprises at least one carrier device to which the strut element is pivotably coupled to.

3. The seat extension apparatus according to claim 2, wherein the carrier device comprises at least one recess into which the strut element is fully arranged when the extension device is in the vertical stowed position.

4. The seat extension apparatus according to claim 3, wherein when the extension device is pivoted from the vertical stowed position to the horizontal use position, the strut element is pivoted such that the strut element is fully arranged outside the recess of the carrier device.

5. The seat extension apparatus according to claim 2, wherein the carrier device comprises at least one storage pocket.

6. The seat extension apparatus according to claim 1, wherein the strut element is U-shaped.

7. The seat extension apparatus according to claim 1, wherein the support structure comprises at least one support linkage configured to pivotably couple the extension device to the support structure.

8. The seat extension apparatus according to claim 7, wherein the support linkage is coupled to each one of the extension device and the support structure via a pivot point.

9. The seat extension apparatus according to claim 8, wherein a pivot point of the strut element and the pivot point of the support linkage are arranged on the same pivot axis.

10. The seat extension apparatus according to claim 9, wherein the pivot axis is arranged in a center area along the longitudinal axis of the extension device and perpendicular to the longitudinal axis of the extension device.

11. The seat extension apparatus according to claim 1, wherein a rear side of the extension device comprises at least one latch mechanism to latch the extension device in the horizontal use position.

12. A cabin dividing element for an aircraft cabin arranged in front of a passenger seating arrangement, the cabin dividing element comprising:
   a cabin wall having a surface facing the passenger seating arrangement; and
   a seat extension apparatus comprising:
      a seat extension having a mounting side and a bed surface side, wherein the seat extension is movable between a vertical stowed position and a horizontal use position; and
      a support structure connected to the seat extension wherein the support structure comprises at least one pivotable strut element having at least one end pivotably coupled to the mounting side of the seat extension and at least one free end;
   wherein, in the vertical stowed position of the seat extension, the strut element is arranged along the mounting side of the seat extension;
   wherein, in the horizontal use position of the seat extension, the strut element is arranged substantially perpendicular or angled to a longitudinal axis of the seat extension to support the seat extension;
   wherein the seat extension apparatus is mounted to the surface of the cabin wall such that the seat extension apparatus is located between the cabin wall and the passenger seating arrangement in both of the vertical stowed position and the horizontal use position; and
   wherein the cabin wall comprises a latch element and the seat extension comprises for a latch mechanism connected to a rear end of the seat extension and configured to detachably engage the latch element of the cabin wall wherein the latch mechanism is disengaged from the latch element when in the vertical stowed position and engaged with the latch element when in the horizontal use position.

13. The cabin dividing element according to claim 12, wherein the support structure comprises at least a bracket fixedly connected to the cabin wall to pivotably connect the seat extension to the cabin wall.

14. The cabin dividing element according to claim 12, wherein the wall surface comprises a vertically extending cavity for receiving the latch mechanism of the seat extension apparatus when the seat extension is moved from the vertical stowed position to the horizontal use position.

15. The cabin dividing element according to claim 12, wherein the cabin wall comprises an attachment mechanism for at least one bassinet.

16. The aircraft cabin according to claim 12, wherein the passenger seating arrangement comprises at least one pivotable armrest having at least one stowable tray table.

17. The aircraft cabin according to claim 12, wherein the armrest is movable between a retracted stowed position, in which the armrest is arranged substantially alongside a side surface of a backrest of the passenger seating arrangement, and a deployed use position, in which the armrest is arranged substantially parallel and above a seat cushion of the passenger seating arrangement.

18. The aircraft cabin according to claim 12, wherein when the seat extension is positioned in the horizontal use position an upper surface of the bed surface side of the seat extension is in substantial coplanar alignment with an upper surface of a seat of the passenger seating arrangement.

19. The cabin dividing element according to claim 12, wherein the seat extension apparatus is configured such that the rear side of the seat extension moves upwardly along the cabin wall from the vertical stowed position to the horizontal use position.

20. A method of deploying of a seat extension apparatus connected to a cabin wall comprising:
- moving a seat extension having from a vertical stowed position in which the seat extension is parallel to the cabin wall to a horizontal use position in which the seat extension is perpendicular to the cabin wall,
- pivoting a strut element having a first end pivotably connected to an undersurface of the seat extension at a first pivot axis from a position substantially parallel to the seat extension when in the vertical stowed position to a position substantially perpendicular or angled with respect to the seat extension when in the horizontal use position; and
- pivoting a support linkage having a first end pivotably connected to the first pivot axis and a second end pivotably connected to a bracket that is connected to the cabin wall.

\* \* \* \* \*